(12) United States Patent
Islam et al.

(10) Patent No.: US 10,736,063 B2
(45) Date of Patent: Aug. 4, 2020

(54) NEIGHBOR CELL SYNCHRONIZATION SIGNAL BLOCK INDEX DETERMINATION

(71) Applicant: QUALCOMM Incorporated, San Diego, CA (US)

(72) Inventors: Muhammad Nazmul Islam, Edison, NJ (US); Navid Abedini, Raritan, NJ (US); Junyi Li, Chester, NJ (US); Bilal Sadiq, Basking Ridge, NJ (US); Chinmay Vaze, San Diego, CA (US); Sumeeth Nagaraja, San Diego, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/008,748

(22) Filed: Jun. 14, 2018

(65) Prior Publication Data

US 2018/0376438 A1    Dec. 27, 2018

Related U.S. Application Data

(60) Provisional application No. 62/525,675, filed on Jun. 27, 2017.

(51) Int. Cl.
*H04W 56/00* (2009.01)
*H04W 72/04* (2009.01)
*H04W 52/02* (2009.01)

(52) U.S. Cl.
CPC ..... *H04W 56/001* (2013.01); *H04W 56/0015* (2013.01); *H04W 72/0406* (2013.01);
(Continued)

(58) Field of Classification Search
CPC .......................... H04W 56/001; H04W 72/046
See application file for complete search history.

(56) References Cited

U.S. PATENT DOCUMENTS

2015/0358848 A1* 12/2015 Kim .............. H04W 24/10
370/252
2016/0302167 A1  10/2016 Yi
(Continued)

FOREIGN PATENT DOCUMENTS

| WO | WO-2014165712 A1 | 10/2014 |
| WO | WO-2017023232 A1 | 2/2017 |
| WO | WO2017097562 A1 | 6/2017 |

OTHER PUBLICATIONS

International Search Report and Written Opinion—PCT/US2018/037873—ISA/EPO—dated Aug. 23, 2018.

*Primary Examiner* — Angel T Brockman
(74) *Attorney, Agent, or Firm* — Holland & Hart LLP

(57) ABSTRACT

Methods, systems, and devices for wireless communication are described. A user equipment (UE) being served by a first cell may receive a synchronization signal (SS) block from the first cell. The UE may also receive an SS block from a second cell. The first cell may determine synchronization assistance information for the second cell and transmit the synchronization assistance information to the UE. The UE may use the synchronization assistance information to determine the index for the SS block from the second cell. For example, the synchronization assistance information may indicate that the UE is to use the index of the SS block from the first cell as the index for the SS block from the second cell. Once the index for the SS block from the second cell is determined, the UE may identify the subframe or slot timing used by the second cell and proceed with cell acquisition.

25 Claims, 17 Drawing Sheets

(52) U.S. Cl.
CPC ..... *H04W 72/046* (2013.01); *H04W 72/0446* (2013.01); *H04W 52/0225* (2013.01)

(56) References Cited

U.S. PATENT DOCUMENTS

2017/0094624 A1 3/2017 Balachandran et al.
2017/0295551 A1 10/2017 Sadiq et al.
2018/0049142 A1 2/2018 Yang et al.

* cited by examiner

NEIGHBOR CELL SYNCHRONIZATION SIGNAL BLOCK INDEX DETERMINATION

CROSS REFERENCES

The present Application for Patent claims the benefit of U.S. Provisional Patent Application No. 62/525,675 by Islam et al., entitled "Neighbor Cell Synchronization Signal Block Index Determination," filed Jun. 27, 2017, assigned to the assignee hereof, and expressly incorporated herein.

BACKGROUND

The following relates generally to wireless communication, and more specifically to neighbor cell synchronization signal block index determination.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station may transmit synchronization signals (SS) blocks to assist a UE in synchronizing with a cell associated with the base station. For example, an SS block may include signals that assist the UE in acquiring the cell's timing. A base station may transmit multiple SS blocks, for example in a SS burst that lasts for a particular duration of time. SS blocks may be transmitted at a different times and in different directions using beam forming, for example in a beam sweeping pattern. A UE that receives an SS block during an SS burst may attempt to use that SS block to determine the timing of the associated cell. However, the UE may not be able to do so without knowing which SS block in the burst it received. Although the temporal location of each SS block within an SS burst may be indicated by an index associated with the SS block, the UE may be unaware of the index for an SS block when it receives the SS block.

SUMMARY

The described features generally relate to one or more improved systems, methods, and/or apparatuses for cell synchronization at a user equipment (UE). More specifically, the described features relate to synchronization signal (SS) block index determination at a UE. For example, a UE served by a serving base station and associated serving cell may receive synchronization assistance information for a neighbor cell. The synchronization assistance information may be used by the UE to determine the index for an SS block sent from the neighbor cell. If the neighbor cell is close to the serving cell, the synchronization assistance information may alert the UE that an SS block index from the serving cell can be used as the index for an SS block received by the neighbor cell. If the neighbor cell is far from the serving cell, the synchronization assistance information may notify the UE that the neighbor cell SS block index can be determined by reading a control channel included in the SS block. In some cases, the UE may assume that it can use a serving cell SS block index as the neighbor cell SS block index. The UE may inform the base station of its assumption, and the base station can correct the UE if the assumption is invalid.

In some cases, the synchronization assistance information may include an indication of cells whose SS block indices can be obtained from the serving cell. If the neighbor cell is included in such an indication, the UE may use an SS block index of the serving cell as the index for an SS block received from the neighbor cell. In other cases, the synchronization assistance information may include an indication of cells whose SS block indices cannot be obtained from the serving cell. If the neighbor cell is included in such an indication, the UE may obtain the SS block index from a control channel included in the SS block.

In some examples, the synchronization assistance information may include an indication of the distance between the serving cell and the neighbor cell. If the distance is within a threshold distance, the UE may select a serving cell SS block index as the index for a neighbor cell SS block. If the distance is too great (e.g., larger than a threshold distance), the UE may decide to obtain the neighbor cell SS block index from the control channel of the SS block.

In some cases, the synchronization assistance information may include the duration of time during which the serving cell transmits an SS burst. If the duration of time exceeds a threshold period of time, the UE may select a serving cell SS block index as the index for a neighbor cell SS block. If the duration of time is less than the threshold period of time, the UE may obtain the SS block index from the control channel of the SS block. In some cases, the synchronization assistance information may indicate a period of time after an SS block is sent or received from the serving cell. If the UE receives a neighbor cell SS block within the SS block measurement window, the UE may select the preceding serving cell SS block index as the index for the target cell SS block. If the UE does not receive a neighbor cell SS block within the SS block measurement window, the UE may obtain the neighbor cell SS block index from the control channel of the SS block.

In some cases, the UE may combine multiple target cell SS blocks to determine the neighbor cell SS block index. In such cases, the UE may select which neighbor cell SS blocks to combine based on the number of neighbor cell SS blocks transmitted by the neighbor cell in an SS burst. The serving cell may use the synchronization assistance information to indicate the number of neighbor cell SS blocks in a neighbor cell SS burst.

A method of wireless communication at a UE is described. The method may include receiving a first SS block from a first cell, receiving, from a second cell, synchronization assistance information for the first cell, and determining a first index of the first SS block based on the synchronization assistance information, the first index identifying a location of the first SS block within a set of time or frequency resources.

An apparatus for wireless communication at a UE is described. The apparatus may include a processor, memory in electronic communication with the processor, and instructions stored in the memory. The instructions may be executable by the processor to cause the apparatus to receive a first SS block from a first cell, receive, from a second cell, synchronization assistance information for the first cell, and determine a first index of the first SS block based on the synchronization assistance information, the first index identifying a location of the first SS block within a set of time or frequency resources.

Another apparatus for wireless communication at a UE is described. The apparatus may include means for receiving a first SS block from a first cell, receiving, from a second cell, synchronization assistance information for the first cell, and determining a first index of the first SS block based on the synchronization assistance information, the first index identifying a location of the first SS block within a set of time or frequency resources.

A non-transitory computer-readable medium storing code for wireless communication at a UE is described. The code may include instructions executable by a processor to receive a first SS block from a first cell, receive, from a second cell, synchronization assistance information for the first cell, and determine a first index of the first SS block based on the synchronization assistance information, the first index identifying a location of the first SS block within a set of time or frequency resources.

In some examples of the method, apparatuses, and non-transitory computer-readable medium described herein, the first SS block includes a PSS, a SSS, a physical broadcast control channel (PBCH), and a demodulation reference signal (DMRS) for PBCH.

In some examples of the method, apparatuses, and non-transitory computer-readable medium described herein, the set of time or frequency resources identify resources allocated for transmission of multiple SS blocks by the first cell using a set of transmit beams.

Some examples of the method, apparatuses, and non-transitory computer-readable medium described herein may further include operations, features, means, or instructions for determining a symbol or slot timing for the first cell based on the determined first index.

Some examples of the method, apparatuses, and non-transitory computer-readable medium described herein may further include operations, features, means, or instructions for receiving a second SS block from the second cell, where determining the first index may be further based on the second SS block.

In some examples of the method, apparatuses, and non-transitory computer-readable medium described herein, determining the first index may include operations, features, means, or instructions for identifying a second index of a second SS block within resources used for transmission of a set of SS blocks by the second cell and selecting the second index as the first index.

Some examples of the method, apparatuses, and non-transitory computer-readable medium described herein may further include operations, features, means, or instructions for selecting the second index as the first index may be based on a cell identifier included in the synchronization assistance information.

Some examples of the method, apparatuses, and non-transitory computer-readable medium described herein may further include operations, features, means, or instructions for identifying, based on the synchronization assistance information, a number of SS blocks transmitted by the first cell during a time duration.

Some examples of the method, apparatuses, and non-transitory computer-readable medium described herein may further include operations, features, means, or instructions for determining a duration of an SS burst based on the synchronization assistance information, where the SS burst includes a set of SS blocks from the first cell.

Some examples of the method, apparatuses, and non-transitory computer-readable medium described herein may further include operations, features, means, or instructions for determining that the duration of the SS burst fails to satisfy a threshold and obtaining a second index from a control channel signal included in a second SS block.

Some examples of the method, apparatuses, and non-transitory computer-readable medium described herein may further include operations, features, means, or instructions for determining that the duration of the SS burst satisfies a threshold and selecting a second index of a second SS block received from the second cell as the first index.

Some examples of the method, apparatuses, and non-transitory computer-readable medium described herein may further include operations, features, means, or instructions for detecting that the first SS block was received during a time duration indicated by the synchronization assistance information and selecting a second index of a second SS block as the first index based on the detection, where the second index identifies a location of the second SS block within resources used for transmission of a set of SS blocks by the second cell.

Some examples of the method, apparatuses, and non-transitory computer-readable medium described herein may further include operations, features, means, or instructions for detecting that the first SS block was received outside a time duration indicated by the synchronization assistance information and obtaining a second index from a control channel signal included in a second SS block based on the detection.

A method of wireless communication at a base station is described. The method may include transmitting a set of SS blocks using a set of transmit beams, determining synchronization assistance information for a neighbor cell of a UE, and transmitting the synchronization assistance information to the UE.

An apparatus for wireless communication at a base station is described. The apparatus may include a processor, memory in electronic communication with the processor, and instructions stored in the memory. The instructions may be executable by the processor to cause the apparatus to transmit a set of SS blocks using a set of transmit beams, determine synchronization assistance information for a neighbor cell of a UE, and transmit the synchronization assistance information to the UE.

Another apparatus for wireless communication at a base station is described. The apparatus may include means for transmitting a set of SS blocks using a set of transmit beams, determining synchronization assistance information for a neighbor cell of a UE, and transmitting the synchronization assistance information to the UE.

A non-transitory computer-readable medium storing code for wireless communication at a base station is described. The code may include instructions executable by a processor to transmit a set of SS blocks using a set of transmit beams, determine synchronization assistance information for a neighbor cell of a UE, and transmit the synchronization assistance information to the UE.

In some examples of the method, apparatuses, and non-transitory computer-readable medium described herein, each SS block of the set of SS blocks may have an index identifying the SS block relative to other SS blocks of the set of SS blocks.

In some examples of the method, apparatuses, and non-transitory computer-readable medium described herein, the synchronization assistance information may be specific to the UE or a group of UEs including the UE.

In some examples of the method, apparatuses, and non-transitory computer-readable medium described herein, the synchronization assistance information may be specific to the neighbor cell or a group of neighbor cells including the neighbor cell.

In some examples of the method, apparatuses, and non-transitory computer-readable medium described herein, the synchronization assistance information may be used by the UE to identify a second index for a SS block received from the neighbor cell.

Some examples of the method, apparatuses, and non-transitory computer-readable medium described herein may further include operations, features, means, or instructions for determining a time duration during which the set of SS blocks may be transmitted, where the synchronization assistance information indicates the time duration.

Some examples of the method, apparatuses, and non-transitory computer-readable medium described herein may further include operations, features, means, or instructions for determining a number of SS blocks transmitted in the set of SS blocks by the neighbor cell, where the synchronization assistance information indicates the number of SS blocks.

Some examples of the method, apparatuses, and non-transitory computer-readable medium described herein may further include operations, features, means, or instructions for determining a time duration following the transmission of the set of SS blocks, where the synchronization assistance information indicates the time duration.

In some examples of the method, apparatuses, and non-transitory computer-readable medium described herein, a first SS block of the set of SS blocks may be transmitted by the neighbor cell as one of a set of beamformed SS block transmissions, the set of beamformed SS block transmissions each associated with one or more of a set of SS block indices.

A method of wireless communication at a UE is described. The method may include receiving a first SS block from a first cell serving the UE, receiving a second SS block from a second cell, determining an index of the second SS block based on an index of the first SS block, and transmitting a message identifying the second cell and indicating that the UE received the second SS block.

An apparatus for wireless communication at a UE is described. The apparatus may include a processor, memory in electronic communication with the processor, and instructions stored in the memory. The instructions may be executable by the processor to cause the apparatus to receive a first SS block from a first cell serving the UE, receive a second SS block from a second cell, determine an index of the second SS block based on an index of the first SS block, and transmit a message identifying the second cell and indicating that the UE received the second SS block.

Another apparatus for wireless communication at a UE is described. The apparatus may include means for receiving a first SS block from a first cell serving the UE, receiving a second SS block from a second cell, determining an index of the second SS block based on an index of the first SS block, and transmitting a message identifying the second cell and indicating that the UE received the second SS block.

A non-transitory computer-readable medium storing code for wireless communication at a UE is described. The code may include instructions executable by a processor to receive a first SS block from a first cell serving the UE, receive a second SS block from a second cell, determine an index of the second SS block based on an index of the first SS block, and transmit a message identifying the second cell and indicating that the UE received the second SS block.

Some examples of the method, apparatuses, and non-transitory computer-readable medium described herein may further include operations, features, means, or instructions for determining a symbol or slot timing for the second cell based on the index of the second SS block.

Some examples of the method, apparatuses, and non-transitory computer-readable medium described herein may further include operations, features, means, or instructions for receiving, based on the transmission, a transmission from the first cell indicating a relationship between indices for SS blocks from the first cell and indices for SS blocks from the second cell.

Some examples of the method, apparatuses, and non-transitory computer-readable medium described herein may further include operations, features, means, or instructions for obtaining a new index of the second SS block from a control channel included in the second SS block based on the relationship.

Some examples of the method, apparatuses, and non-transitory computer-readable medium described herein may further include operations, features, means, or instructions for determining that a response from the first cell may have not been received within a threshold period of time following the transmission and confirming the determined index of the second SS block based on the determination that the response may have not been received.

A method of wireless communication at a base station is described. The method may include receiving, from a UE served by the base station in a serving cell, a message identifying a neighbor cell and indicating that the UE received a first SS block from the neighbor cell, determining, based on the message, a relationship between indices for SS blocks from the serving cell and indices for SS blocks from the neighbor cell, and transmitting, to the UE, synchronization assistance information based on the determined relationship.

An apparatus for wireless communication at a base station is described. The apparatus may include a processor, memory in electronic communication with the processor, and instructions stored in the memory. The instructions may be executable by the processor to cause the apparatus to receive, from a UE served by the base station in a serving cell, a message identifying a neighbor cell and indicating that the UE received a first SS block from the neighbor cell, determine, based on the message, a relationship between indices for SS blocks from the serving cell and indices for SS blocks from the neighbor cell, and transmit, to the UE, synchronization assistance information based on the determined relationship.

Another apparatus for wireless communication at a base station is described. The apparatus may include means for receiving, from a UE served by the base station in a serving cell, a message identifying a neighbor cell and indicating that the UE received a first SS block from the neighbor cell, determining, based on the message, a relationship between indices for SS blocks from the serving cell and indices for SS blocks from the neighbor cell, and transmitting, to the UE, synchronization assistance information based on the determined relationship.

A non-transitory computer-readable medium storing code for wireless communication at a base station is described. The code may include instructions executable by a processor to receive, from a UE served by the base station in a serving cell, a message identifying a neighbor cell and indicating that the UE received a first SS block from the neighbor cell, determine, based on the message, a relationship between indices for SS blocks from the serving cell and indices for SS blocks from the neighbor cell, and transmit, to the UE, synchronization assistance information based on the determined relationship.

In some examples of the method, apparatuses, and non-transitory computer-readable medium described herein, determining the relationship between the indices for SS blocks from the serving cell and the indices for SS blocks from the neighbor cell may include operations, features, means, or instructions for determining that a delay between transmission and reception of the SS block from the neighbor cell exceeds a delay threshold and the method further including identifying that the UE cannot use a first index of a second SS block transmitted by the base station as a second index for the first SS block.

In some examples of the method, apparatuses, and non-transitory computer-readable medium described herein, determining the relationship between the indices for SS blocks from the serving cell and the indices for SS blocks from the neighbor cell may include operations, features, means, or instructions for determining that a delay between transmission and reception of the SS block from the neighbor cell may be less than a delay threshold and the method further including identifying that the UE can use a first index of a second SS block transmitted by the base station as a second index for the first SS block.

DETAILED DESCRIPTION

Figure 1:
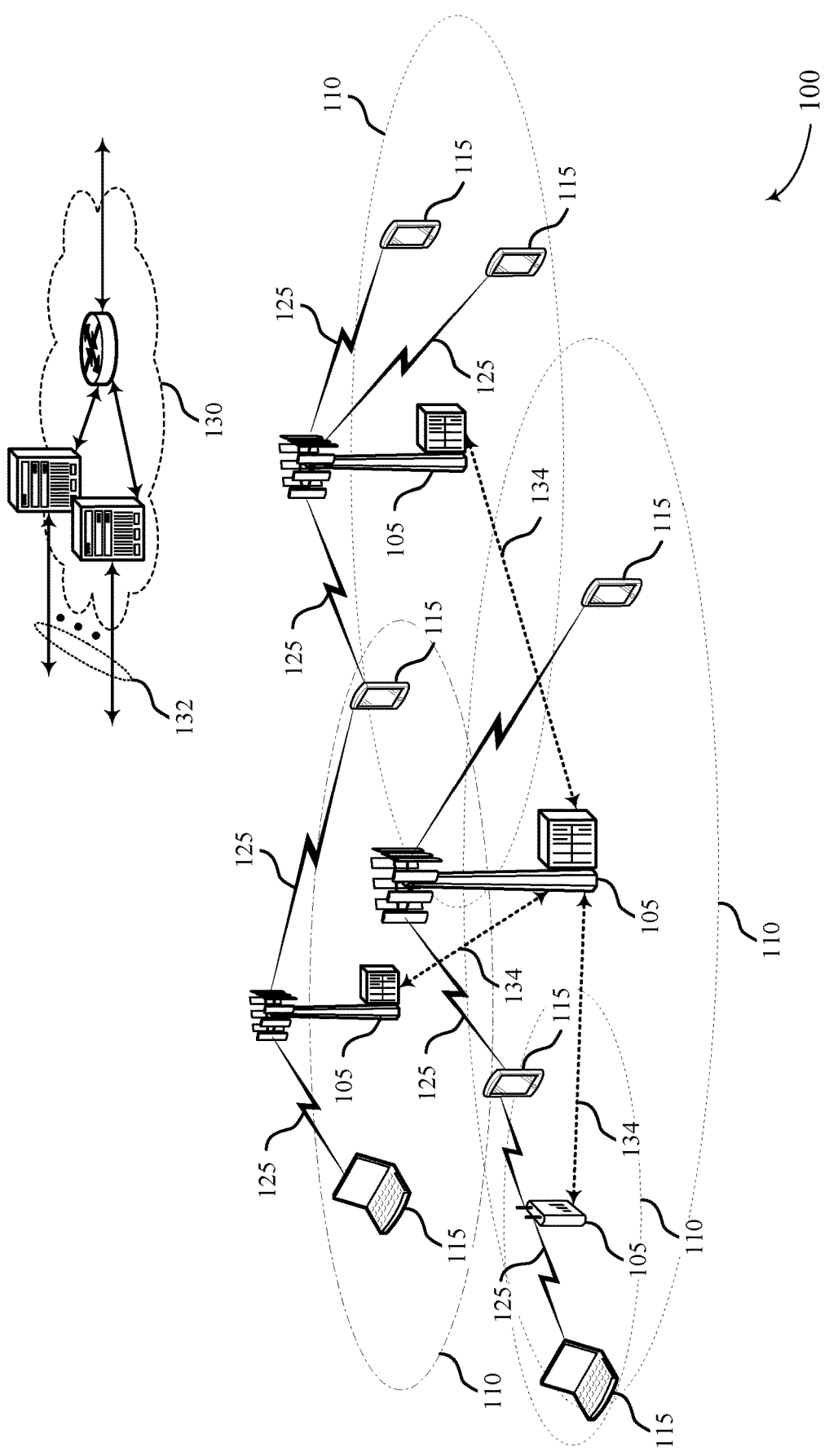
FIG. 1 illustrates an example of a system for wireless communication that supports neighbor cell synchronization signal block index determination in accordance with aspects of the present disclosure.

Some wireless communications systems may facilitate cell acquisition via signaling that assists a user equipment (UE) to determine the timing of a neighboring cell. For example, in New Radio (NR), a neighboring cell (e.g., a target cell) may transmit synchronization signal (SS) blocks that a UE can use to synchronize with the neighboring cell. The neighboring cell may transmit multiple SS blocks in different directions (e.g., using beamforming) during an SS burst that lasts a period of time known as the SS burst set measurement window. Each SS block within a burst may be transmitted at a different time within the SS burst set measurement window. Accordingly, each SS block (and associated transmit beam) may be associated with an index that identifies the temporal location of the SS block relative to other SS blocks in the SS burst. However, the SS block index for an SS block may be unknown to the UE when the UE receives the SS block. Consequently, the UE may be unaware of the temporal location of the SS block within the SS burst set measurement window, and thus may be unable to synchronize at a subframe or slot level.

According to the techniques described herein, a UE may use synchronization assistance information from a serving cell to determine the SS block index of a neighboring cell. The synchronization assistance information can be sent from the serving cell in response to a message from the UE or independent of signaling from the UE. In some cases, the synchronization assistance information may include an indication of cells whose SS block indices can be obtained from the serving cell. If the neighboring cell is included in such an indication, the UE may use an SS block index of the serving cell as the index for an SS block received from the neighboring cell. In other cases, the synchronization assistance information may include an indication of cells whose SS block indices cannot be obtained from the serving cell. If the neighboring cell is included in such an indication, the UE may obtain the SS block index from a control channel included in the SS block. For example, the SS block index may be obtained from other synchronization signals in the SS block that carry SS block index information (e.g., the SS block index may be obtained from the physical broadcast control channel (PBCH) or a demodulation reference signal (DMRS) within the PBCH).

In some examples, the synchronization assistance information may include an indication of the distance between the UE and the neighboring cell. If the distance is within a threshold distance, the UE may select a serving cell SS block index as the index for a neighboring cell SS block. The serving cell SS block from which the index is selected may be the last serving cell SS block received by the UE prior to the neighboring cell SS block. If the distance is too great (e.g., outside a threshold distance), the UE may instead obtain the neighboring cell SS block index from the control channel of the SS block.

In some cases, the synchronization assistance information may include the SS burst set measurement window used by the neighboring cell. If the SS burst measurement window less than a threshold period of time (e.g., a particular time duration), the UE may select a serving cell SS block index as the index for a neighboring cell SS block. If the SS burst measurement window exceeds the threshold period of time, the UE may obtain the SS block index from the control channel of the SS block. In some cases, the synchronization assistance information may indicate a period of time after an SS block is sent or received from the serving cell (referred to as an SS block measurement window). If the UE receives a neighboring cell SS block within the SS block measurement window, the UE may select the preceding serving cell SS block index as the index for the neighboring cell SS block. If the UE does not receive a neighboring cell SS block within the SS block measurement window, it obtains the neighboring cell SS block index from the control channel of the SS block. In some cases, the UE may combine multiple neighboring cell SS blocks for a more reliable detection. In such cases, the UE may select which neighboring cell SS blocks to combine based on the number of neighboring cell SS blocks transmitted by the neighboring cell in an SS burst. The serving cell use the synchronization assistance information to indicate the number of SS blocks in a SS burst.

In some cases, the UE 115 may select a serving cell SS block index as the index for a neighboring cell SS block without synchronization assistance information from the serving cell. In such cases, the UE 115 may send a message to the serving cell indicating that the UE is using serving cell SS block indices as neighboring cell SS block indices. If the neighboring cell does not support such a practice, the serving cell may instruct the UE to obtain neighboring cell indices from the control channels included in neighboring cell SS blocks.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support synchronization signaling that assists UEs 115 with determining the index or timing of a detected SS block.

Base stations 105 may wirelessly communicate with UEs 115 via one or more base station antennas. Each base station 105 may provide communication coverage for a respective geographic coverage area 110 and may be associated with a cell. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In NR, the symbol spacing in the time domain may vary with the tone spacing (or subcarrier spacing (SCS)) in the frequency domain. For example, an SCS of 240 kHz may correspond to a symbol duration of ~4 µs, while an SCS of 30 kHz may correspond to a symbol duration of ~33 µs. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Synchronization (e.g., for cell acquisition) may be performed using synchronization signals or channels transmitted by a synchronization source (e.g., a base station 105). A base station 105 may transmit synchronization signals containing discovery reference signals. Synchronization signals may include a primary synchronization signal (PSS) or a secondary synchronization signal (SSS). A UE 115 attempting to access a wireless network may perform an initial cell search by detecting a PSS from a base station 105. The PSS may enable synchronization of slot timing and may indicate a physical layer identity value. The PSS may be utilized to acquire timing and frequency portions of a cell identification (e.g., physical cell identifier (PCID)). The UE 115 may then receive an SSS. The SSS may enable radio frame synchronization, and may provide a cell identity value, which may be combined with the physical layer identity value to form the PCID, which identifies the cell. The SSS may also enable detection of a duplexing mode and a cyclic prefix (CP) length. An SSS may be used to acquire other system information (e.g., bandwidth, subframe index). The PBCH may be used to acquire additional system information needed for acquisition (e.g., bandwidth, radio frame index/number, etc.). In some cases, the PBCH may carry master information block (MIB) and one or more system information blocks (SIBs) for a given cell.

In some cases (e.g., in NR), a base station 105 may transmit synchronization signal (SS) blocks, including a group of signals transmitted over a set of time and frequency resources, which may containing discovery reference signals or other synchronization signals. For example, an SS block may include a PSS (e.g., one PSS symbol), an SSS (e.g., one SSS symbol), and PBCH (e.g., two PBCH symbols), or other synchronization signals (e.g., a third synchronization signal (TSS). In some examples, the signals included in an SS block may be time division multiplexed, such as a time division multiplexed first PBCH, PSS, second PBCH, and SSS (transmitted in the indicated order), or a time division multiplexed first PBCH, PSS, SSS, and second PBCH (transmitted in the indicated order), etc. In other examples, PBCH transmissions may be transmitted in a subset of SS block time resources (e.g., in two symbols of an SS block), and synchronization signals (e.g., PSS and SSS) may be transmitted in another subset of SS block time resources.

In some wireless communication technologies, the PSS, SSS, and PBCH may be periodically sent in a pseudo-omni directional manner, and may be sent according to different periods. For example, the PSS and SSS may be sent every 5 ms and the PBCH may be sent every 10 ms. A UE 115 that is connected to a serving cell may use the SSS from the serving cell to determine the timing for a neighbor cell. For instance, if the two cells are synchronous, the UE 115 may obtain the neighbor cell's timing by detecting the neighbor's SSS and comparing it to the SSS of its serving cell. If the two cells are asynchronous, the UE 115 can employ the same procedure to determine the timing of the neighbor cell as long as the timing offset between the two cells is within ±5 ms. Thus, a UE 115 that detects a neighbor cell's SSS can determine the exact time of the neighbor cell within a 10 ms window.

In deployments that use millimeter wave (mmW) transmission frequencies (e.g., in NR), multiple SS blocks may be transmitted in different directions using beam sweeping in a SS burst, and SS bursts may be periodically transmitted according to a SS burst set. The duration of an SS burst may be referred to herein as an SS burst set measurement window. The number of directions in which the SS blocks are sent during a burst (e.g., during an SS burst set measurement window of 4 or 5 ms) may be different in different configurations, and the number of directions may also be a function of the bandwidth over which the base station 105 is operating. For example, SS blocks may be sent (e.g., beamformed) in four different directions when the base station 105 is operating in the 0-3 GHz range, in eight different directions when the base station is operating in the 3-6 GHz range, and up to sixty-four different directions when the base station is operating in the 6+ GHz range.

Because each SS block is sent at a slightly different time during the SS burst set measurement window, a UE 115 that receives an SS block may not know when the SS block was sent in the SS burst measurement window (and thus may not be able to determine the exact timing of the associated cell). To determine the location of the SS block in the time domain, the UE 115 may determine the SS block index, which indicates temporal location of the SS block the relative to other SS blocks in the burst. The SS block index may be associated with a particular SS block and transmit beam. The SS block index may represent time domain information for the SS block such as OFDM symbol or slot index within the SS burst set. Thus, the UE 115 may reference the SS block index to derive the symbol or slot index for an SS block in a radio frame. The SS block index may be conveyed in the PBCH of the SS block, or in the DMRS of the PBCH signal. Each SS block index in an SS burst may be a unique value for that SS burst. According to the techniques described herein, the UE 115 may obtain the SS block index of a neighbor cell with or without assistance from a serving cell.

In one example involving serving cell assistance, the UE 115 may receive synchronization assistance information from the serving cell (e.g., via a base station 105 associated with the serving cell). The synchronization assistance information may indicate whether the UE 115 can use the SS block index from a serving cell SS block as the SS block index for an SS block from the neighbor cell (e.g., the synchronization assistance information may indicate whether the neighbor cell SS block index can be obtained from the serving cell). In some examples, the synchronization assistance information may indicate the distance between the neighbor cell and the serving cell. The UE 115 may use the distance information to determine whether SS block indices can be translated from the serving cell to the neighbor cell. In some cases, the synchronization assistance information may indicate the SS burst set measurement window. If the SS burst set measurement window is longer than normal, the UE 115 may determine that SS block indices cannot be translated from the serving cell to the neighbor cell. If the burst set measurement window is of normal length, the UE 115 may determine that SS block indices can be translated from the serving cell to the neighbor cell.

In some examples, the synchronization assistance information may include the number of SS blocks transmitted by the neighbor cell, or the location of the SS blocks transmitted by the neighbor cell. This information may help the UE 115 determine which SS blocks to combine in order to process the SS block index of the neighbor cell In some examples, the synchronization assistance information may include an SS block measurement window (e.g., the duration of time during which the UE 115 should monitor for, or expect, an SS block from the neighbor cell). If the UE 115 receives an SS block from the neighbor cell outside of the SS block measurement window, the UE 115 may determine that SS block indices cannot be translated from the serving cell to the neighbor cell.

In one example of neighbor cell synchronization without serving cell assistance, the UE 115 may receive an SS block from the serving cell and an SS block from the neighbor cell. The UE 115 may determine an index of the serving cell SS block and apply it to (e.g., assign it to) the SS block from the neighbor cell. The UE 115 may send a report to the serving cell indicating the cell identifier (ID) of the neighbor cell. The report may indicate to the serving cell that the UE 115 wishes to translate the indices from the serving cell to the neighbor cell. In response to the report, the serving cell may determine whether the indices are translatable between the two cells (e.g., based on the distance between the two cells or the distances between UE and the two cells). If the serving cell determines that the indices are translatable, the serving cell may convey that information to the UE 115 so that the UE 115 can start using the indices from serving cell SS blocks for neighbor SS blocks. If the serving cell determines that the indices are not translatable, the serving cell may convey that information to the UE 115 so that the UE 115 can determine the index for a neighbor cell SS block by decoding the associated PBCH (or DMRS). The techniques described herein may be uses in synchronous and asynchronous wireless networks.

Figure 2:
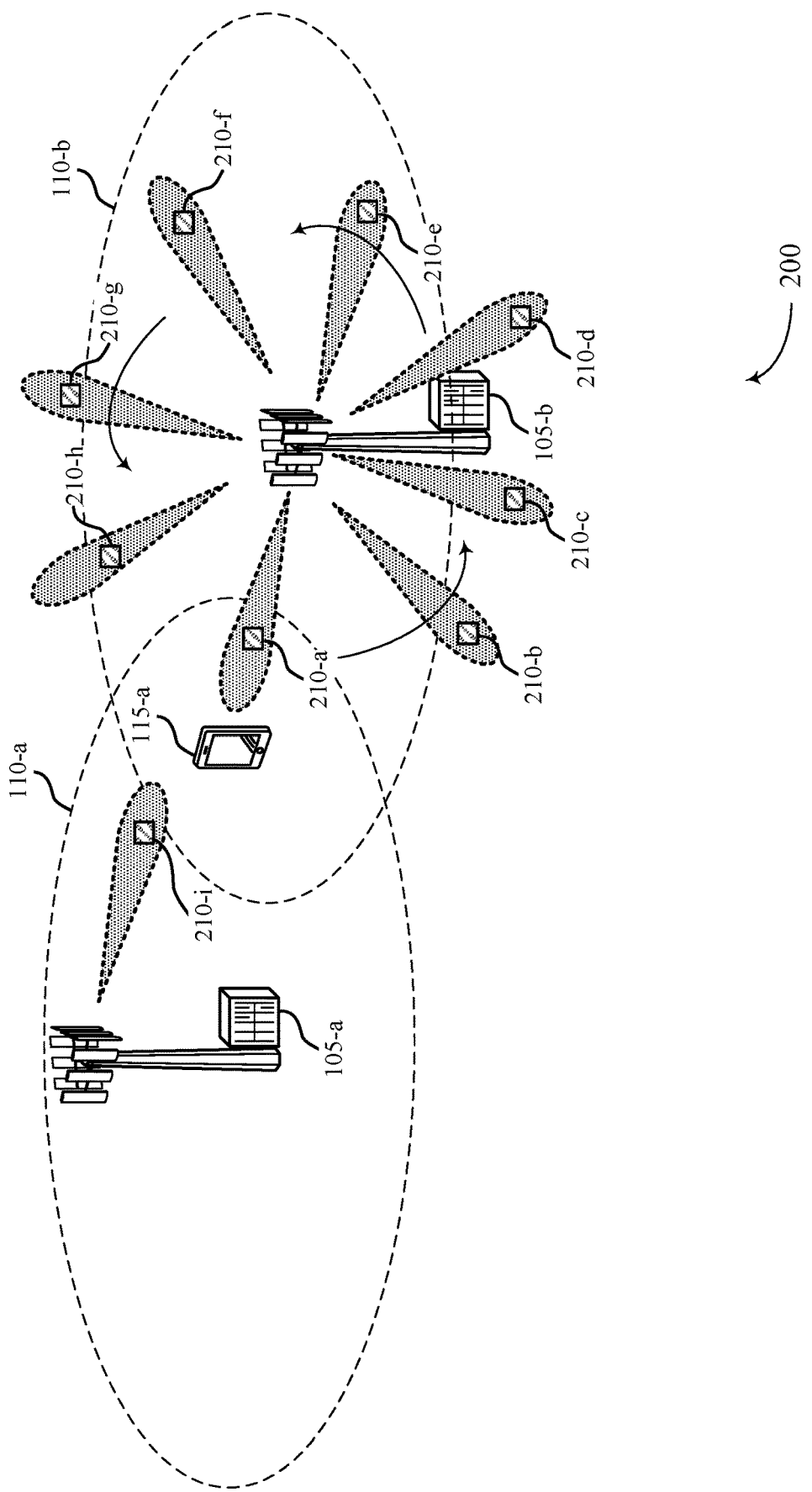
FIG. 2 illustrates an example of a wireless communications system that supports neighbor cell synchronization signal block index determination in accordance with aspects of the present disclosure.

FIG. 2 illustrates an example of a wireless communications system 200 for neighbor cell synchronization signal block index determination in accordance with various aspects of the present disclosure. Wireless communications system 200 includes base station 105-a, base station 105-b, and UE 115-a, which may be examples of the corresponding devices described with reference to FIG. 1. Base station 105-a may support communications with wireless devices inside coverage area 110-a and base station 105-b may support communications with wireless devices inside coverage area 110-b. Base station 105-a may be associated with a cell serving UE 115-a and base station 105-b may be associated with a neighbor cell. Thus, UE 115-a may aware of the timing for base station 105-a but unaware of the timing for base station 105-b. According to the techniques described herein, UE 115-a may determine the timing for base station 105-b using synchronization assistance information and/or SS blocks from base station 105-a.

Base station 105-a and base station 105-b may transmit a number of beamformed SS blocks 210 in different directions (e.g., in an SS burst) to facilitate cell acquisition and synchronization. For example, base station 105-b may transmit eight SS blocks 210 in eight different directions during an SS burst set measurement window of 4 ms. UE 115-a may receive SS block 210-a and attempt to determine the timing for base station 105-b. However, because each SS block 210 in the SS burst is transmitted at a different time during the SS burst measurement window, UE 115-a may not know which SS block 210 it received, and thus may be unable to determine the exact timing of base station 105-b. To determine which SS block 210 was received, UE 115-a may determine the index of SS block 210-a. The index may indicate when SS block 210-a was sent in the SS burst set measurement window relative to the other SS blocks 210 in the burst.

In some cases, base station 105-a may send synchronization assistance information to UE 115 that assists the UE 115 with determining the index for an SS block from base station 105-b. For example, if the distance between the two base stations 105 (or their associated cells) is within a threshold distance, base station 105-a may use the synchronization assistance information to indicate to UE 115-a that it may use the index of SS block 210-i as the index of SS block 210-a. Thus, UE 115-a may determine the index for an SS block from base station 105-b by referencing the index for an SS block from base station 105-a received just prior to the SS block from base station 105-b. The distance between two cells or base stations 105 may be referred to herein as the inter-site distance. If the inter-site distance is greater than a threshold distance, the synchronization assistance information may indicate to UE 115-a that it should determine the index for SS block 210-a by reading the PBCH or DMRS included in SS block 210-a.

Figure 3:
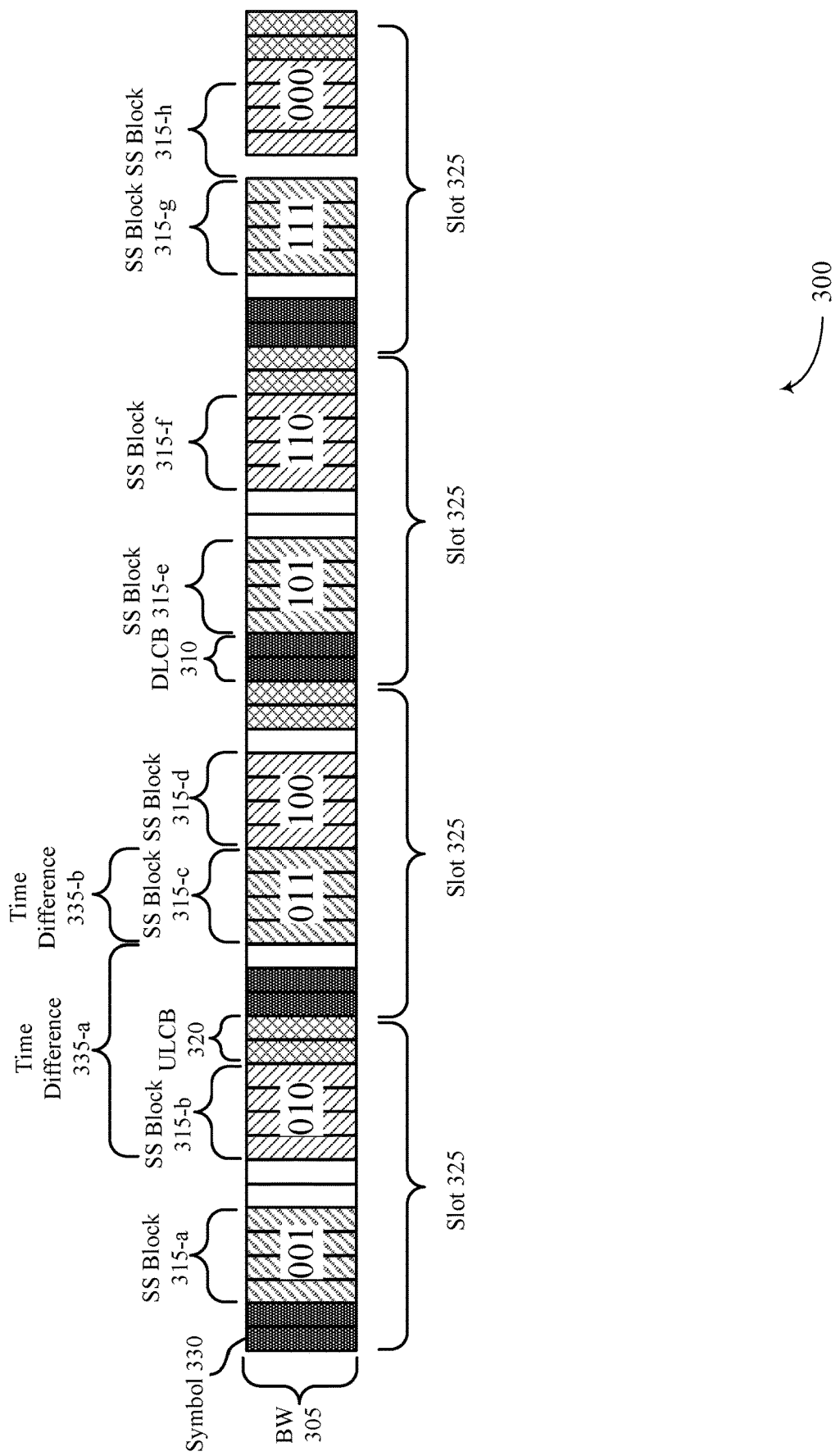
FIG. 3 illustrates an example of an SS burst that supports neighbor cell synchronization signal block index determination in accordance with aspects of the present disclosure.

FIG. 3 illustrates an example of an SS burst 300 for use in neighbor cell synchronization signal block index determination in accordance with various aspects of the present disclosure. SS burst may include downlink common control blocks (DLCBs) 310, SS blocks 315, and uplink common control blocks (ULCBs) 320. ULCBs 320 may include guard periods (GP), which may provide enough time for delayed DLCBs 310 to be received. SS burst may be transmitted over a bandwidth 305 (e.g., the SS burst may be sent with an SCS of 15 kHz) and may include four slots 325 (in some examples slots 325 may be subframes) with a duration of, e.g., 1 ms each. Thus, eight SS blocks 315 may be sent in SS burst 300 during a 4 ms SS burst set measurement window. Each slot 325 may include fourteen symbols 330. SS burst 300 may be transmitted by a base station 105 that is associated with a cell (e.g., a serving or neighbor cell).

Each SS block 315 may be transmitted (e.g., beamformed) in a unique direction and may be associated with a unique SS block index for that SS burst. The transmit beam used to transmit the SS block 315 may also be associated with the SS block index. The SS block index may increment by one for each subsequent SS block 315 and may wrap around (e.g., begin again) at the beginning of the next SS block burst. Thus, SS block 315-a may be sent in a first direction and may be associated with an SS block index of 1 and SS block 315-b may be sent in a second direction and may be associated with an SS block index of 2. The SS blocks 315 may correspond to the SS blocks 210 in FIG. 2. For example, SS block 315-a may correspond to SS block 210-a, SS block 315-b may correspond to SS block 210-b, SS block 315-c may correspond to SS block 210-c, etc. In some cases, multiple SS blocks 315 may be sent in the same direction.

The SS block index may be conveyed by the PBCH in each SS block 315, or by the DMRS signal in the PBCH. A UE 115 may receive several SS blocks 315 so that it may combine the PBCH signal in each SS block 315 to increase the detection reliability. In some cases, the UE 115 may determine which SS blocks 315 to combine based on the number of SS blocks 315 sent during an SS burst. The number of SS blocks 315 sent in an SS block burst may be indicated by synchronization assistance information sent from a cell serving the UE 115.

In some cases, the UE 115 may determine the time difference 335 between the transmission of two SS blocks 315. A UE 115 may determine the time difference by determining the number of symbols 330 in between the lead symbols of two back-to-back SS blocks 315. For example, the time difference 335-a between SS block 315-b and SS block 315-c may be the duration of nine symbols. In another example, the time different 335-b between SS block 315-c and SS block 315-d may be the duration of four symbols. A UE 115 may use the time difference 335 between two back-to-back SS blocks 315 to determine which technique to use in determining indices for the SS blocks 315.

Figure 4:
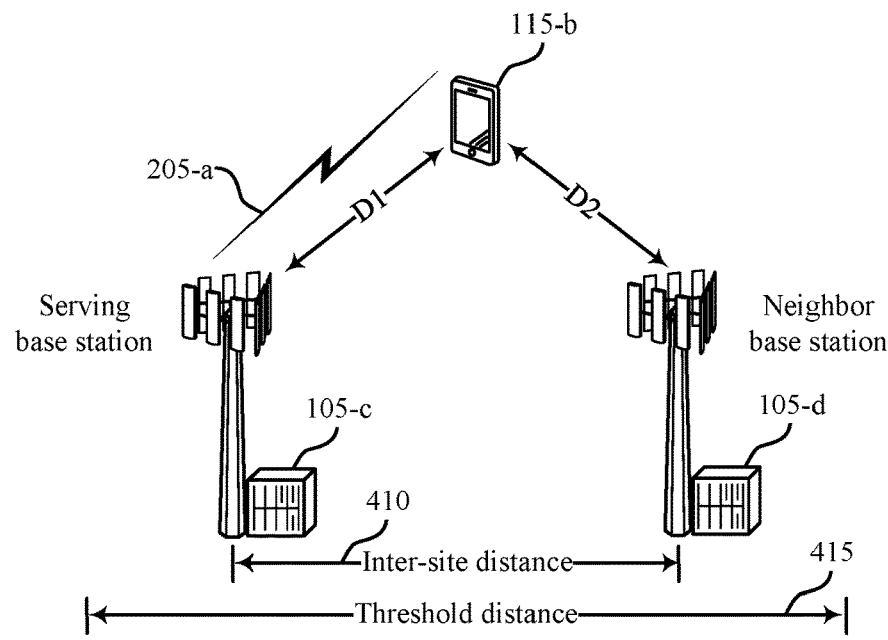
FIG. 4 illustrates an example of SS block signaling in a wireless communications system that supports neighbor cell synchronization signal block index determination in accordance with aspects of the present disclosure.
Figure 4:
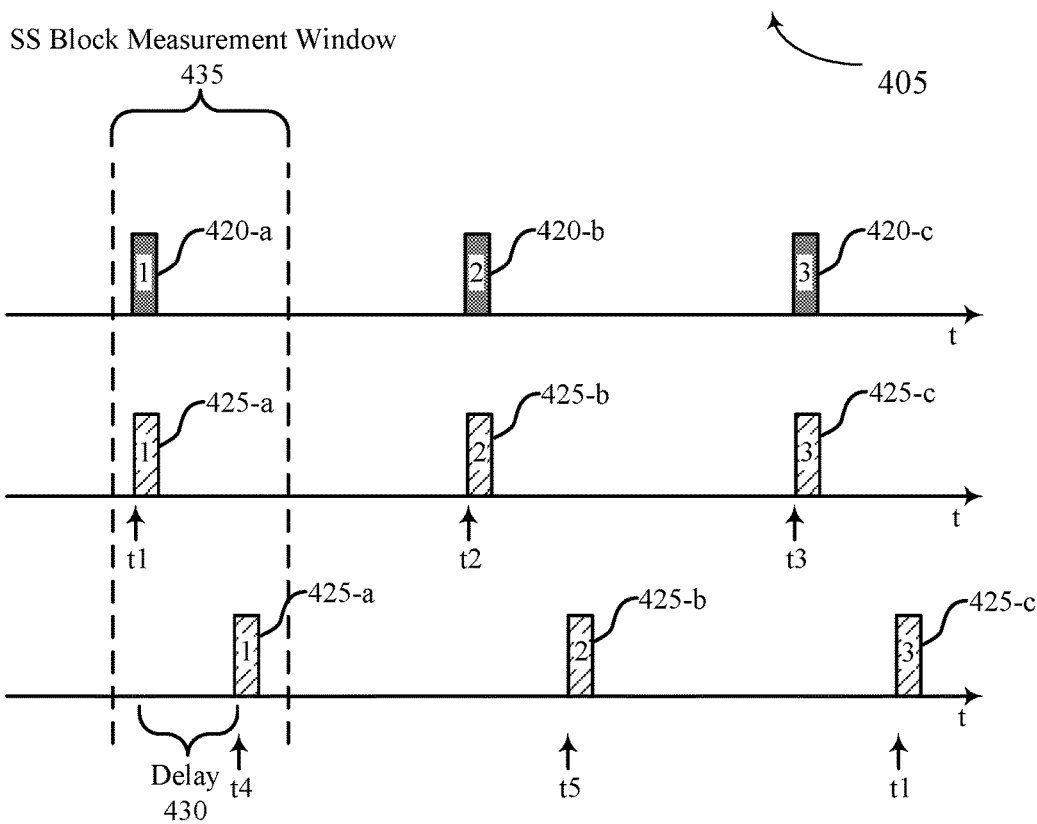

FIG. 4 illustrates an example of SS block signaling 400 in a wireless communications system 405 that supports neighbor cell synchronization signal block index determination in accordance with various aspects of the present disclosure. Wireless communications system 405 may include a serving base station 105-c that communicates with UE 115-b via communication link 205-a. Wireless communications system 405 may also include a neighbor base station 105-c. A neighbor base station 105 may be base station 105 that is not currently serving a UE 115 and that has timing that is unknown to the UE 115. Serving base station 105-c may be associated with a cell serving UE 115-b and neighbor base station 105-d may be associated with a cell that is not serving UE 115-b. Serving base station 105-c may be closer to UE 115-b than neighbor base station 105-d (e.g., UE 115-b may be a distance D1 from serving base station 105-c and a distance D2 from neighbor base station 105-d, where D1<D2). The inter-site distance 410 between serving base station 105-c and neighbor base station 105-d may be less than a threshold distance 415 (e.g., inter-site distance 410 may be 1 km).

Serving base station 105-c may transmit beamformed SS blocks 420 in different directions. Each SS block 420 (and its associated transmit beam) may be associated with an SS block index (e.g., SS block 420-a may be associated with SS block index 1, SS block 420-b may be associated with SS block index 2, and SS block 420-c may be associated with SS block index 3). Neighbor base station 105-c may also transmit beamformed SS blocks 425 in different directions. Like the SS blocks 420, each SS block 425 may be associated with an SS block index (e.g., SS block 425-a may be associated with SS block index 1, SS block 425-b may be associated with SS block index 2, and SS block 425-c may be associated with SS block index 3). The SS blocks 425 may be transmitted at different times within an SS burst set measurement window. For instance, SS block 425-a may be transmitted at time t1, SS block 425-b may be transmitted at time t2, and SS block 425-c may be transmitted at time t3.

Signals sent from neighbor base station 105-d and signals sent from serving base station 105-c may experience delay arising from, e.g., a propagation path. Due to the different path lengths between UE 115-b and the base stations 105, signals from neighbor base station 105-d may experience more propagation delay than signals from serving base station 105-c. Thus, the inter-site distance 410 between serving base station 105-c and neighbor base station 105-d may influence when signals arrive at UE 115-b. For example, signals sent from neighbor base station 105-d may arrive at UE 115-b with a greater delay than signals sent from serving base station 105-c. Thus, SS block 425-a may be transmitted at time t1, but may not be received by UE 115-b until time t4. That is, there may be a delay 430 between transmission and reception of SS block 425-a. Similarly, SS block 425-b may be sent at time t2 and received, after delay 430, at time t5. And SS block 425-c may be sent at time t3 and received, after delay 430, at time t6. The delay 430 may be a function of the inter-site distance (e.g., a delay of 3.33 μs may result from an inter-site distance of 1 km) and the location of UE 115-b.

If the delay 430 is smaller than a threshold delay, then UE 115-b may use the indices of SS blocks 420 as the indices for SS blocks 425 (e.g., UE 115-b may refrain from decoding the PBCH or DMRS to obtain the indices for SS blocks 425). The threshold delay may be determined based on the time difference between two back-to-back SS blocks 420. Thus, if the delay 430 is 3.33 μs and the time difference between two back-to-back SS blocks 420 is 16 μs (e.g., for an SS block numerology of 240 kHz), then UE 115-b can use the index of SS block 420-a (e.g., SS block index 1) as the index for SS block 425-a. Similarly, UE 115-b can use the index of SS block 420-b (e.g., SS block index 2) as the index for SS block 425-b. And UE 115-b can use the index of SS block 420-c (e.g., SS block index 3) as the index for SS block 425-c. Thus, UE 115-b may use the index from the SS block 420 immediately preceding SS block 425-a as the index for SS block 425-a. In other cases, UE 115-b may translate the index of an SS block 420 that is not immediately preceding an SS block 425. For example, if D2 is between two thresholds (e.g., T1<D2<T2), the index of the second SS block received from neighbor base station 105-d may be equal to the index of a first SS block received from serving base station 105-c (e.g., the SS block 420 received before the last SS block 420 was received). Using the indices of SS blocks from a serving base station 105 as the indices for SS blocks from neighbor base station 105 may be referred to herein as translating or transferring the SS block indices.

In some cases, UE 115-b may determine whether it can translate SS block indices based on the inter-site distance 410. For instance, UE 115-b may compare the inter-site distance 410 to a threshold distance 415. If the inter-site distance 410 is less than the threshold distance 415, UE 115-b may translate SS block indices. If the inter-site distance 410 exceeds the threshold distance 415, UE 115-b may not translate SS block indices. A similar process may be employed by serving base station 105-c. In some cases, UE 115-b may receive an indication of the inter-site distance 410 in synchronization assistance information sent by serving base station 105-c. In other cases, the synchronization assistance information may include the cell IDs of cells that support translated SS block indices (e.g., the synchronization assistance information may include the cell IDs of cells whose SS block indices can be obtained from serving base station 105-c). Or the synchronization assistance information may include the cell IDs of cells that do not support translated SS block indices (e.g., the synchronization assistance information may include the cell IDs of cells whose SS block indices cannot be obtained from serving base station 105-c and instead must be obtained from the SS blocks 425).

In some cases, UE 115-b may determine whether it can translate SS block indices based on the relative distances between UE 115-b and each base station 105. For example, if both D1 and D2 are within a threshold distance, UE 115-b may translate SS block indices (because the propagation delay for both base stations will be substantially similar). Thus, if the base stations 105 are at roughly the same relative distance to UE 115-b (e.g. UE is at the cell-edge), then their transmissions may arrive at UE 115-b at roughly the same time, and UE 115-b can translate SS block indices. Such a scenario may arise even if the two base stations 105 are very far from each other. In the example shown in FIG. 4, UE 115-b may determine that distance D2 is similar enough to distance D1 (e.g., because the difference between distance D1 and distance D2 is within a threshold difference) to support translated SS block indices.

In some cases, UE 115-b may determine whether base station 105-d supports translated SS block indices by monitoring an SS block measurement window 435. An SS block measurement window 435 may be a period of duration of time following transmission of an SS block 420. If UE 115-b receives an SS block 425 (e.g., SS block 425-a) within the SS block measurement window 435, UE 115-b may determine that base station 105-d supports translated SS block indices. If UE 115-b does not receive an SS block 425 within the SS block measurement window 435, UE 115-b may determine that base station 105-d does not support translated SS block indices. The SS block measurement window 435 may be determined by serving base station 105-c and may be indicated to UE 115-b. The SS block measurement window may be UE-specific and/or cell specific.

Figure 5:
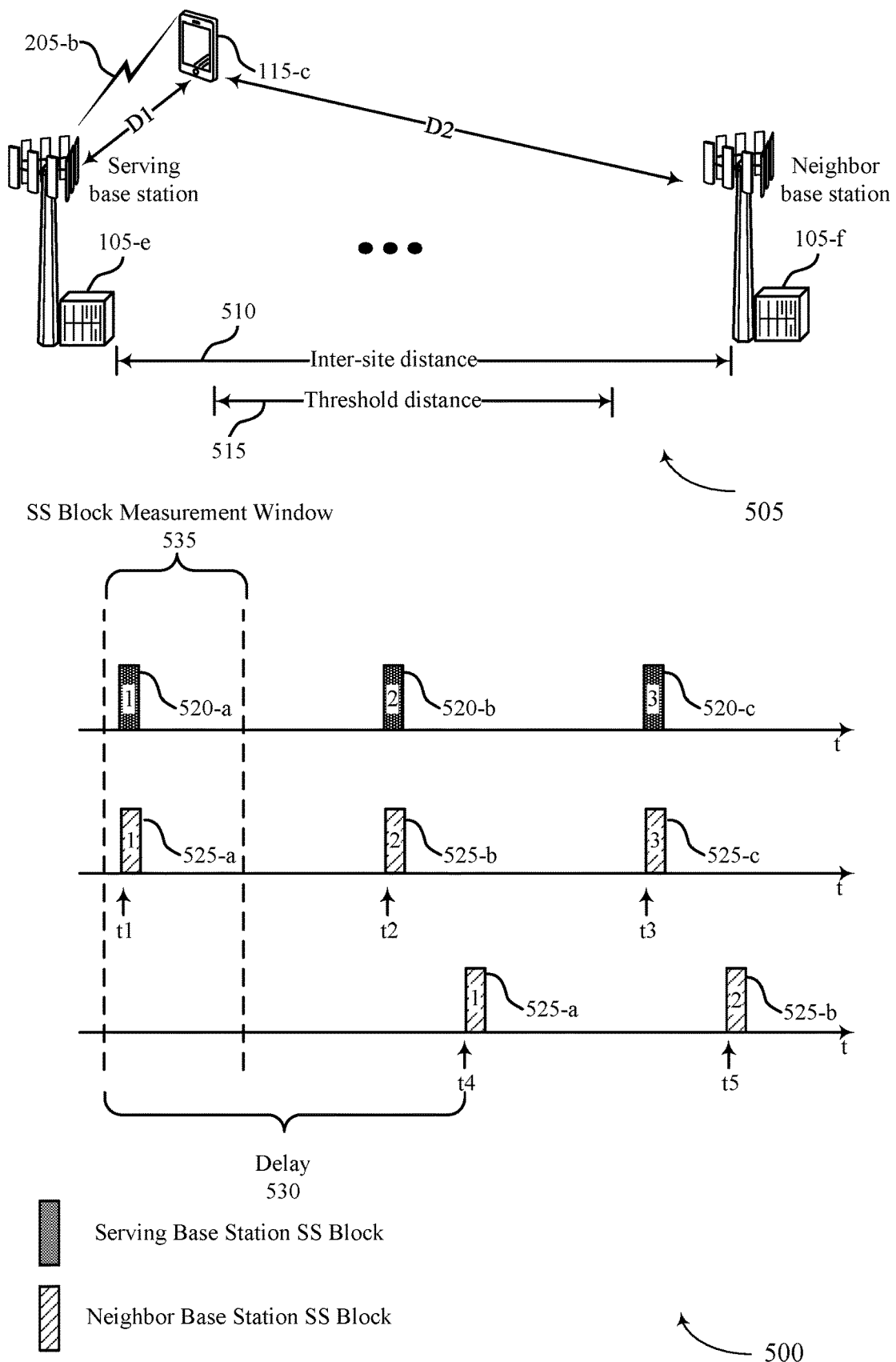
FIG. 5 illustrates an example of SS block signaling in a wireless communications system that supports neighbor cell synchronization signal block index determination in accordance with aspects of the present disclosure.

FIG. 5 illustrates an example of SS block signaling 500 in a wireless communications system 505 that supports neighbor cell synchronization signal block index determination in accordance with various aspects of the present disclosure. Wireless communications system 505 may include a serving base station 105-e that communicates with UE 115-c via communication link 205-b. Wireless communications system 405 may also include a neighbor base station 105-f. Serving base station 105-e may be associated with a cell serving UE 115-c and neighbor base station 105-f may be associated with a cell that is not serving UE 115-c. The inter-site distance 510 between serving base station 105-c and neighbor base station 105-d may be greater than a threshold distance 515 (e.g., inter-site distance 510 may be 50 km).

Serving base station 105-e may transmit beamformed SS blocks 520 in different directions. Each SS block 520 may be associated with an SS block index (e.g., SS block 520-a may be associated with SS block index 1, SS block 520-b may be associated with SS block index 2, and SS block 520-c may be associated with SS block index 3). Neighbor base station 105-f may also transmit beamformed SS blocks 525 in different directions. Like the SS blocks 520, each SS block 525 may be associated with an SS block index (e.g., SS block 525-a may be associated with SS block index 1, SS block 525-b may be associated with SS block index 2, and SS block 525-c may be associated with SS block index 3). The SS blocks 525 may be transmitted at different times within an SS burst set measurement window. For instance, SS block 525-a may be transmitted at time t1, SS block 525-b may be transmitted at time t2, and SS block 525-c may be transmitted at time t3.

Signals sent from neighbor base station 105-e and signals sent from serving base station 105-f may experience delay arising from, e.g., a propagation path. Due to the different path lengths between UE 115-c and the base stations 105, signals from neighbor base station 105-f may experience more propagation delay than signals from serving base station 105-e. Thus, the inter-site distance 510 between serving base station 105-e and neighbor base station 105-f may influence when signals arrive at UE 115-c. For example, signals sent from neighbor base station 105-f may arrive at UE 115-c with a greater delay than signals sent from serving base station 105-e. For instance, SS block 525-*a* may be transmitted at time t1, but may not be received by UE 115-*c* until time t4. That is, there may be a delay 530 between transmission and reception of SS block 525-*a*. Similarly, SS block 525-*b* may be sent at time t2 and received, after delay 530, at time t5. And SS block 525-*c* may be sent at time t3 and received, after delay 530, at time t6. The delay 530 may be a function of the inter-site distance (e.g., a delay of 166.5 μs may result from an inter-site distance of 50 km).

If the delay 530 is smaller than a threshold delay, then UE 115-*c* may use the indices of SS blocks 520 as the indices for SS blocks 525 (e.g., UE 115-*c* may refrain from decoding the PBCH or DMRS to obtain the indices for SS blocks 525). But if the delay 530 is greater than a threshold delay, then UE 115-*c* may not use the indices of SS blocks 520 as the indices for SS blocks 525. This is because the SS block 520 nearest an SS block 525 may have an index that is greater than the correct index for that SS block 525. For example, the SS block 520 nearest to SS block 525-*a* has an index of 2, but the correct index for SS block 525-*a* is 1. Accordingly, UE 115-*c* may decode the PBCH or DMRS to obtain the proper indices for SS blocks 525.

The threshold delay may be determined based on the time difference between two back-to-back SS blocks 520. Thus, if the delay 530 is 166.5 μs and the time difference between two back-to-back SS blocks 420 is 140 μs (e.g., for an SS block numerology of 30 kHz), then UE 115-*c* may not use the index of SS block 520-*a* (e.g., SS block index 1) as the index for SS block 525-*a*. Similarly, UE 115-*c* may not use the index of SS block 520-*b* (e.g., SS block index 2) as the index for SS block 525-*b*. And UE 115-*c* may not use the index of SS block 420-*c* (e.g., SS block index 3) as the index for SS block 525-*c*.

In some cases, UE 115-*c* may determine whether it can translate SS block indices based on the inter-site distance 510. For instance, UE 115-*c* may compare the inter-site distance 510 to a threshold distance 515. If the inter-site distance 510 is less than the threshold distance 515, UE 115-*c* may translate SS block indices. If the inter-site distance 510 exceeds the threshold distance 515, UE 115-*c* may not translate SS block indices. A similar process may be employed by serving base station 105-*e*. In some cases, UE 115-*c* may receive an indication of the inter-site distance 510 in synchronization assistance information sent by serving base station 105-*e*. In other cases, the synchronization assistance information may include the cell IDs of cells that support translated SS block indices (e.g., the synchronization assistance information may include the cell IDs of cells whose SS block indices can be obtained from serving base station 105-*e*). Or the synchronization assistance information may include the cell IDs of cells that do not support translated SS block indices (e.g., the synchronization assistance information may include the cell IDs of cells whose SS block indices cannot be obtained from serving base station 105-*e* and instead must be obtained from the SS blocks 525).

In some cases, UE 115-*c* may determine whether it can translate SS block indices based on the relative distances between UE 115-*c* and each base station 105. For example, if both D1 and D2 are outside a threshold distance, UE 115-*b* may determine that translated SS block indices are not supported (because the propagation delay for both base stations will be too great). Thus, if the base stations 105 are at substantially different relative distances from UE 115-*c*, then their transmissions may arrive at UE 115-*c* at different times, and UE 115-*c* cannot translate SS block indices. In the example shown in FIG. 5, UE 115-*c* may determine that distance D2 is too different from distance D1 (e.g., the difference between distance D1 and distance D2 exceeds a threshold distance) to support translated SS block indices.

In some cases, UE 115-*c* may determine whether base station 105-*e* supports translated SS block indices by monitoring SS block measurement window 535. If UE 115-*c* receives an SS block 525 within the SS block measurement window 535, UE 115-*c* may determine that neighbor base station 105-*f* supports translated SS block indices. If UE 115-*c* does not receive an SS block 525 within the SS block measurement window 535 (e.g., if the first SS block 525 received by UE 115-*c* after SS block 520-*a* is received outside of SS block measurement window 535), UE 115-*c* may determine that base station 105-*f* does not support translated SS block indices. In such a scenario, UE 115-*c* may determine the indices for SS blocks 525 by reading the indices from PBCH or DMRS included in the SS blocks 525.

Figure 6:
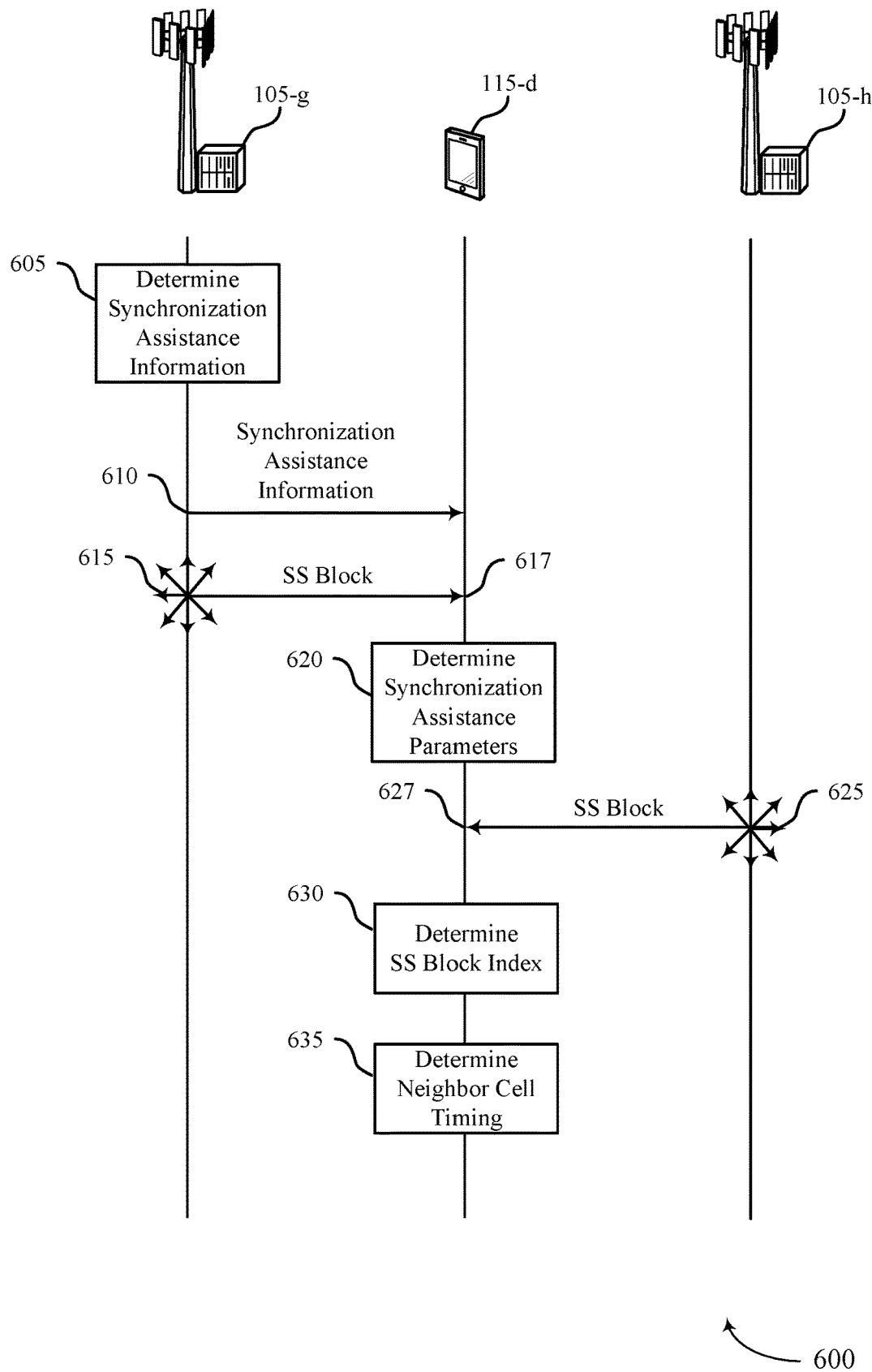
FIG. 6 illustrates an example of a process flow that supports neighbor cell synchronization signal block index determination in accordance with aspects of the present disclosure.

FIG. 6 illustrates an example of a process flow 600 for neighbor cell synchronization signal block index determination in accordance with various aspects of the present disclosure. Process flow 600 may include serving base station 105-*g*, which is associated with a serving cell, and neighbor base station 105-*h*, which is associated with a neighboring cell. Process flow 600 may also include UE 115-*d*. UE 115-*d* may be aware of the timing (e.g., subframe or slot timing) of serving base station 105-*g* but unaware of the timing (e.g., subframe or slot time) of neighbor base station 105-*h*.

At 605, serving base station 105-*g* may determine synchronization assistance information for neighbor base station 105-*h*. In some cases, serving base station 105-*g* may determine the synchronization assistance information upon request from UE 115-*d*. The synchronization assistance information may be specific to UE 115-*d*, or specific to a group of UEs that includes UE 115-*d*. The synchronization assistance information may be specific to neighbor base station 105-*h*, or specific to a group of neighbor base stations that includes neighbor base station 105-*h*.

In some cases, serving base station 105-*g* determine that a number of cells (including the cell associated with neighbor base station 105-*h*) are within a threshold distance from serving base station 105-*g*. In such cases, the synchronization assistance information may include or indicate the cells that are within the threshold distance (e.g., the synchronization assistance information may include the cell IDs). In some cases, serving base station 105-*g* may determine that a number of cells (including the cell associated with neighbor base station 105-*h*) are outside a threshold distance from serving base station 105-*g*. In such cases, the synchronization assistance information may include or indicate the number of cells that are outside the threshold distance (e.g., the synchronization assistance information may include the cell IDs).

In some cases, serving base station 105-*g* may determine an inter-site distance between serving base station 105-*g* and neighbor base station 105-*h*. The synchronization assistance information may include an indication of the inter-site distance. In some cases, serving base station 105-*g* may determine the SS burst set measurement window used by serving base station 105-*g*. For instance, serving base station 105-*g* may determine a time duration during which multiple SS blocks (e.g., during an SS burst) are sent to UE 115-*d*. The synchronization assistance information may include an indication of the SS burst set measurement window. In some cases, serving base station 105-*g* may determine the number of SS blocks transmitted (e.g., by serving base station 105-*g*, or by neighbor base station 105-*h*) in an SS burst. The synchronization assistance information may include an indication of the number of SS blocks transmitted in the burst. In some cases, serving base station 105-*g* may determine the SS block measurement window for an SS block transmission by neighbor base station 105-*h* (e.g., serving base station 105-*g* may determine a time duration following transmission of an SS block or SS burst). The synchronization assistance information may include an indication of SS block measurement window.

At 610, serving base station 105-*g* may transmit the synchronization assistance information to UE 115-*d*. The synchronization assistance information may be used by UE 115-*d* to identify an index for an SS block received from neighbor base station 105-*h*. At 615, serving base station 105-*g* may transmit multiple SS blocks using multiple transmit beams (e.g., serving base station 105-*g* may transmit an SS burst). Each transmit beam, and associated SS block, may be associated with an SS block index that is unique within the SS burst. In some cases, serving base station 105-*d* may send the SS burst during a period of time (e.g., during an SS burst set measurement window) that is unique to UE 115-*d* or selected for UE 115-*d*. For example, if serving base station 105-*g* detects that neighbor base station 105-*h* is asynchronous or outside a threshold distance from serving base station 105-*g*, serving base station 105-*g* may select an SS burst set measurement window that is long enough (e.g., 6 ms rather than 4 ms) to cover a delayed SS block transmission that is sent from neighbor base station 105-*h*. Thus, serving base station 105-*g* may select an SS burst set measurement window that is based on the inter-site distance for neighbor base station 105-*h*, or based on detection that neighbor base station 105-*h* is not synchronized with serving base station 105-*g*.

At 617, UE 115-*d* may receive an SS block from serving base station 105-*h* ("serving cell SS block"). In some cases, UE 115-*d* may receive multiple SS blocks at 617. In some cases, UE 115-*d* may determine the index of the serving cell SS block.

At 620, UE 115-*d* may determine synchronization assistance parameters from the synchronization assistance information received from serving base station 105-*g*. In one example, UE 115-*d* may determine the inter-site distance between serving base station 105-*g* and neighbor base station 105-*h*. In some cases, UE 115-*d* may determine whether the cell associated with neighbor base station 105-*h* is included in a list of cell IDs included in the synchronization assistance information. In some examples, UE 115-*d* may use the synchronization assistance information to identify the number of SS blocks transmitted by neighbor base station 105-*h* during an SS burst. In such cases, UE 115-*d* may determine the duration of the SS burst from serving base station 105-*g* (e.g., UE 115-*d* may determine the SS burst set measurement window). In some cases, UE 115-*d* may determine the SS block measurement window from the synchronization assistance information.

At 625, neighbor base station 105-*h* may send multiple SS blocks in transmit beams (e.g., neighbor base station 105-*h* may transmit an SS burst). At 627, UE 115-*d* may receive one or more of the SS blocks sent from neighbor base station 105-*h* ("neighbor cell SS block(s)"). At 630, UE 115-*d* may determine an index for the neighbor cell SS block. The determination may be based on the synchronization assistance information parameters derived from the synchronization assistance information.

In one example, UE 115-*d* may determine that the inter-site distance between serving base station 105-*g* and neighbor base station 105-*h* satisfies a distance threshold. In such a scenario, UE 115-*d* may select the index of the serving cell SS block as the index of the neighbor cell SS block. In another example, UE 115-*d* may determine that the inter-site distance between serving base station 105-*g* and neighbor base station 105-*h* fails to satisfy a distance threshold. In such a scenario, UE 115-*d* may obtain the neighbor cell SS block index from the PBCH or DMRS of the neighbor cell SS block.

In one example, UE 115-*d* may select multiple neighbor SS blocks to combine based on the number of SS blocks transmitted during the SS burst at 625. After UE 115-*d* combines the SS blocks, UE 115 may determine the neighbor cell SS block index by reading the PBCH or DMRS associated with the combined SS blocks. In some examples, UE 115-*d* may determine that the SS burst set measurement window satisfies a threshold (e.g., the SS burst measurement window is longer than a default SS burst set measurement window). In such examples, UE 115-*d* may obtain the neighbor cell SS block index from the PBCH or DMRS of the neighbor cell SS block. In some cases, UE 115-*d* may determine that the SS burst set measurement window fails to satisfy the threshold (e.g., the SS burst measurement window is the same length as a default SS burst set measurement window). In such cases, UE 115-*d* may select the serving cell SS block index as the neighbor cell SS block index. Thus, UE 115-*d* may select the neighbor cell block index based on the serving cell SS block.

In some cases, UE 115-*d* may select the serving cell SS block index as the neighbor cell SS block index if the cell associated with neighbor base station 105-*h* is included in a list of cell IDs included in the synchronization assistance information (e.g., if the cell is included in the list of cells that support SS block index translation). In some cases, UE 115-*d* may obtain the neighbor cell SS block index from the PBCH or DMRS of the neighbor cell SS block if the cell associated with neighbor base station 105-*h* is included in a list of cell IDs included in the synchronization assistance information (e.g., if the cell is included in the list of cells that do not support SS block index translation).

In some cases, UE 115-*d* may detect that the neighbor SS block was received within the SS block measurement window indicated by the synchronization assistance information. In such scenarios, UE 115-*d* may select the serving cell SS block index as the neighbor cell SS block index. In some cases, UE 115-*d* may detect that the neighbor SS block was received outside the SS block measurement window indicated by the synchronization assistance information. In such scenarios, UE 115-*d* may obtain the neighbor cell SS block index from the PBCH or DMRS of the neighbor cell SS block. At 635, UE 115-*d* may determine the subframe or slot timing of neighbor base station 105-*h* based on the index determined for the neighbor cell SS block.

Figure 7:
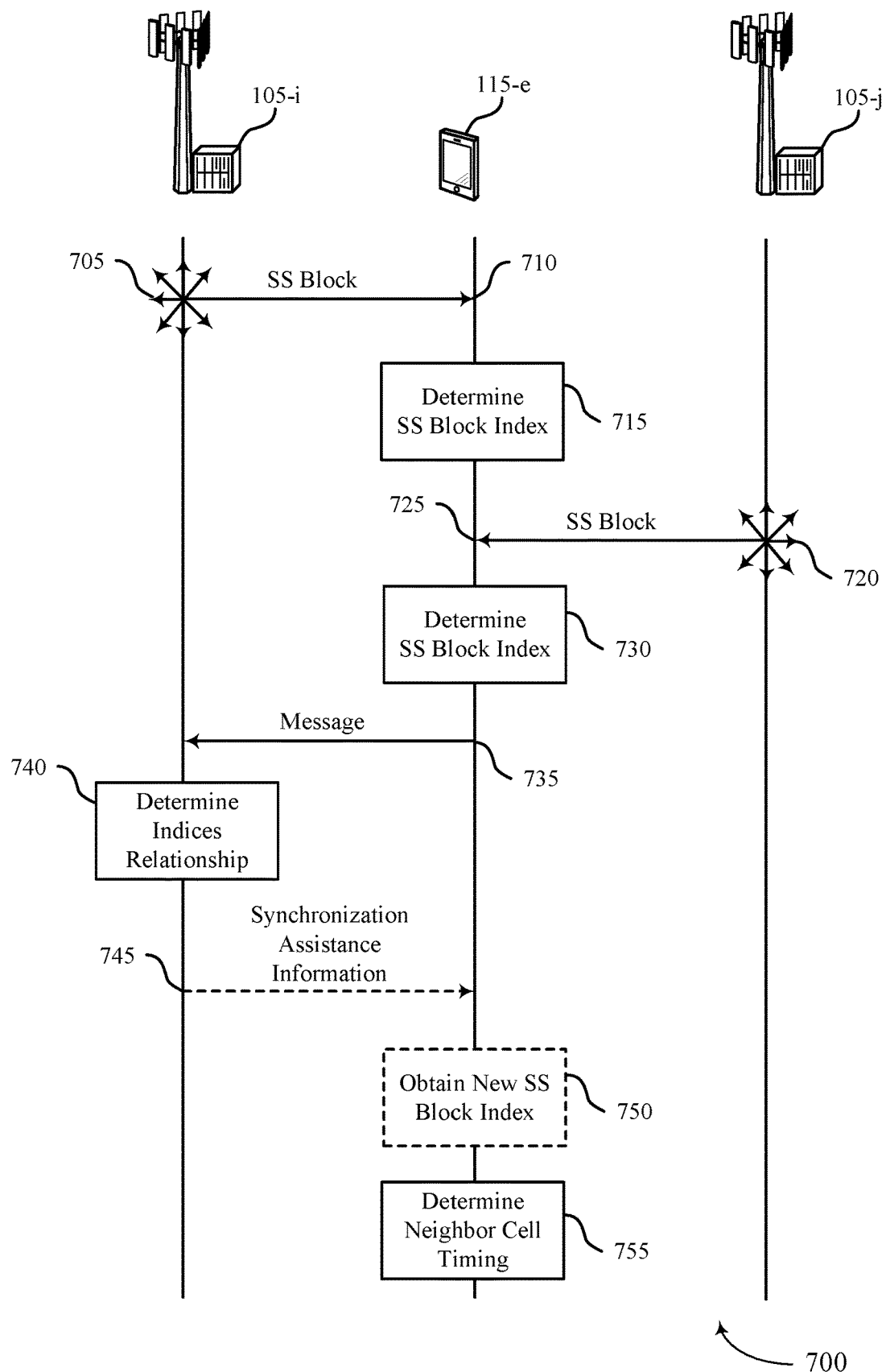
FIG. 7 illustrates an example of a process flow that supports neighbor cell synchronization signal block index determination in accordance with aspects of the present disclosure.

FIG. 7 illustrates an example of a process flow 700 for neighbor cell synchronization signal block index determination in accordance with various aspects of the present disclosure. Process flow 700 may include serving base station 105-*i*, which is associated with a cell serving UE 115-*e*, and neighbor base station 105-*j*, which is associated with a neighboring cell. UE 115-*e* may be aware of the timing (e.g., subframe or slot timing) of serving base station 105-*i* but unaware of the timing (e.g., subframe or slot time) of neighbor base station 105-*j*.

At 705, serving base station 105-*i* may send an SS block burst. At 710, UE 115-*e* may receive an SS block included in the SS burst. At 715, UE 115-*e* may determine the SS block index for the SS block from serving base station 105-*i* ("serving cell SS block index"). For example, UE 115-*e* may read the PBCH or DMRS of the serving cell SS block.

Alternatively, UE 115 may already know the serving cell SS block index based on previous communications with serving base station 105-*i*. At 720, neighbor base station 105-*j* may send an SS block burst. At 725, UE 115-*e* may receive an SS block included in the SS burst. At 730, UE 115-*e* may determine SS block index for the SS block from neighbor base station 105-*j* ("neighbor cell SS block index"). UE 115-*e* may determine the neighbor cell SS block index based on the serving cell SS block index. For example UE 115-*e* may select the serving cell SS block index as the neighbor cell SS block index. At 735, UE 115-*e* may send a message to serving base station 105-*i*. The message may identify the neighbor cell and indicate that UE 115-*e* received the neighbor cell SS block. At 740, serving base station 105-*i* may, based on the message, determine a timing relationship between serving base station 105-*i* and neighbor base station 105-*j*. For example, serving base station 105-*i* may determine a relationship between indices for serving cell SS blocks and indices for neighbor cell SS blocks.

In some cases, serving base station 105-*i* may determine that the delay between transmission and reception of the neighbor cell SS block exceeds a delay threshold. In such cases, serving base station 105-*i* may identify that UE 115-*e* cannot use the serving cell SS block index as the neighbor cell SS block index. In some cases, serving base station 105-*i* may determine the delay based on the inter-site distance between serving base station 105-*i* and neighbor base station 105-*j*. For instance, serving base station 105-*i* may determine that the inter-site distance exceeds a distance threshold.

In some cases, serving base station 105-*i* may determine that the delay between transmission and reception of the neighbor cell SS block does not exceed a delay threshold. In such cases, serving base station 105-*i* may identify that UE 115-*e* can use the serving cell SS block index as the neighbor cell SS block index. In some cases, serving base station 105-*i* may determine the delay based on the inter-site distance between serving base station 105-*i* and neighbor base station 105-*j*. For instance, serving base station 105-*i* may determine that the inter-site distance is within a distance threshold.

At 745, serving base station 105-*i* may send synchronization assistance information to UE 115-*e*. The synchronization assistance information may indicate the timing relationship between serving base station 105-*i* and neighbor base station 105-*j*. For example, the synchronization assistance information may indicate the relationship between indices for serving cell SS blocks and indices for neighbor cell SS blocks. At 750, UE 115-*e* may obtain a new neighbor cell SS block index based on the synchronization assistance information. For example, UE 115-*e* may determine the actual neighbor cell SS block index from the PBCH or DMRS included in the neighbor SS block.

In some cases, serving base station 105-*i* may not send a message to UE 115-*e* at 745 (for example when serving base station 105-*i* determines that UE 115-*e* can use the serving cell SS block index as the neighbor cell SS block index). In such cases, UE 115-*e* may determine that a response from serving base station 105-*i* has not been received within a threshold period of time following the transmission at 735. Based on the determination, UE 115-*e* may confirm and use the serving cell SS block index as the neighbor cell SS block index. At 755, UE 115-*e* may determine the subframe or slot timing of neighbor base station 105-*j* based on the neighbor cell SS block index.

Figure 8:
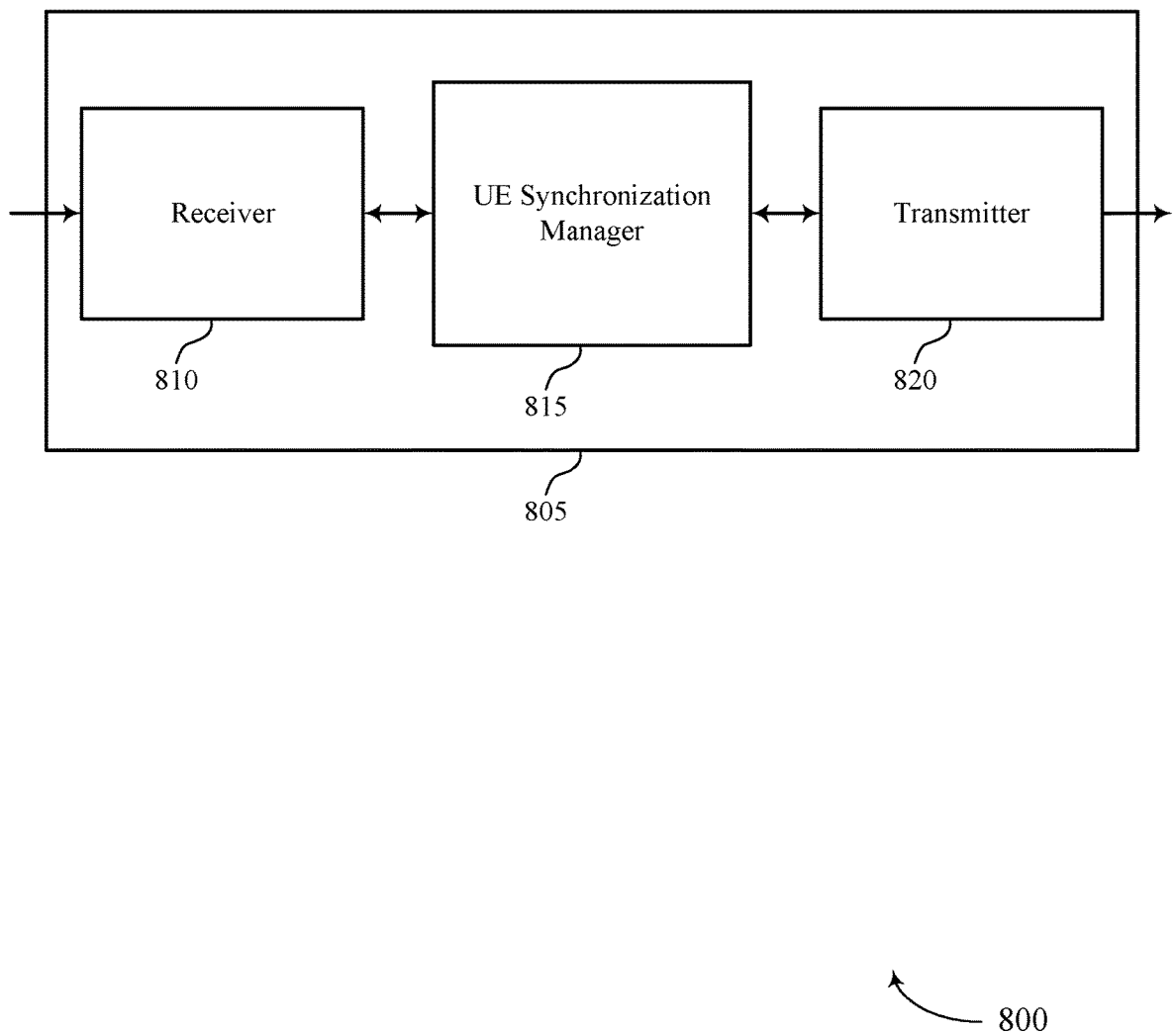
FIG. 8 shows a block diagram of a device that supports neighbor cell synchronization signal block index determination in accordance with aspects of the present disclosure.

FIG. 8 shows a block diagram 800 of a wireless device 805 that supports neighbor cell synchronization signal block index determination in accordance with aspects of the present disclosure. Wireless device 805 may be an example of aspects of a UE 115 as described herein. Wireless device 805 may include receiver 810, UE synchronization manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to neighbor cell synchronization signal block index determination, etc.). Information may be passed on to other components of the device. The receiver 810 may be an example of aspects of the transceiver 1035 described with reference to FIG. 10. The receiver 810 may utilize a single antenna or a set of antennas.

In a first example, UE synchronization manager 815 may receive a first SS block from a neighbor cell. UE synchronization manager 815 may also receive, from a serving cell serving the wireless device 805, synchronization assistance information for the neighbor cell. UE synchronization manager 815 may determine a first index of the first SS block based on the synchronization assistance information. The first index may identify the first SS block relative to other SS blocks transmitted by the neighbor cell using a set of transmit beams. Or the first index may identify a location of the first SS block within a set of time or frequency resources. In some examples, the set of time or frequency resources may identify resources allocated for transmission of multiple SS blocks by the neighbor cell using a plurality of transmit beams.

In a second example, the UE synchronization manager 815 may receive a first SS block from a serving cell serving the wireless device 805. UE synchronization manager 815 may also receive a second SS block from a neighbor cell. UE synchronization manager 815 may determine an index of the second SS block based on an index of the first SS block. UE synchronization manager 815 may transmit a message identifying the neighbor cell and indicating that the wireless device 805 received the first SS block. UE synchronization manager 815 may be an example of aspects of the UE synchronization manager 1015 described with reference to FIG. 10.

UE synchronization manager 815 and/or at least some of its various sub-components may be implemented in hardware, software executed by a processor, firmware, or any combination thereof. If implemented in software executed by a processor, the functions of the UE synchronization manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE synchronization manager 815 and/or at least some of its various sub-components may be physically located at various positions, including being distributed such that portions of functions are implemented at different physical locations by one or more physical devices. In some examples, UE synchronization manager 815 and/or at least some of its various sub-components may be a separate and distinct component in accordance with various aspects of the present disclosure. In other examples, UE synchronization manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
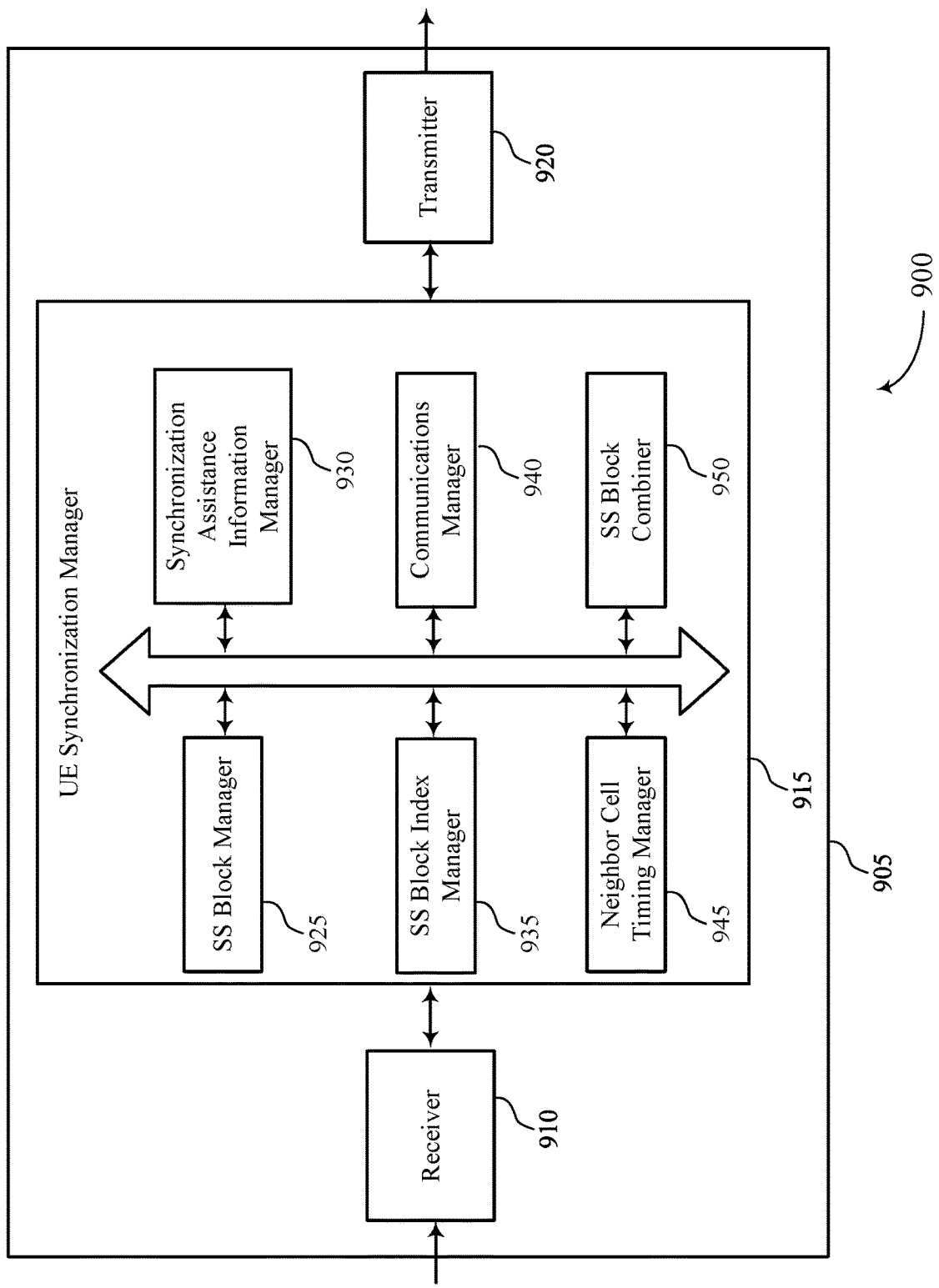
FIG. 9 shows a block diagram of a device that supports neighbor cell synchronization signal block index determination in accordance with aspects of the present disclosure.

FIG. 9 shows a block diagram 900 of a wireless device 905 that supports neighbor cell synchronization signal block index determination in accordance with aspects of the present disclosure. Wireless device 905 may be an example of aspects of a wireless device 805 or a UE 115 as described with reference to FIG. 8. Wireless device 905 may include receiver 910, UE synchronization manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to neighbor cell synchronization signal block index determination, etc.). Information may be passed on to other components of the device. The receiver 910 may be an example of aspects of the transceiver 1035 described with reference to FIG. 10. The receiver 910 may utilize a single antenna or a set of antennas.

UE synchronization manager 915 may also include SS block manager 925, synchronization assistance information manager 930, SS block index manager 935, and communications manager 940. UE synchronization manager 915 may be an example of aspects of the UE synchronization manager 1015 described with reference to FIG. 10.

In an example of serving cell-assisted synchronization, SS block manager 925 may receive an SS block from a neighbor cell ("neighbor cell SS block). SS block manager 925 may also receive an SS block from a serving cell ("serving cell SS block"). In some cases, SS block manager 925 may determine a duration of an SS burst from the neighbor cell based on synchronization assistance information. In some cases, SS block manager 925 may determine that the duration of the SS burst satisfies a threshold and select the index of the serving cell SS block as the index for the neighbor cell SS block. In some cases, SS block manager 925 may detect that the neighbor cell SS block was received during a time duration indicated by synchronization assistance information. In some cases, SS block manager 925 may detect that the neighbor cell SS block was received outside a time duration indicated by synchronization assistance information.

In an example of serving cell-assisted synchronization, synchronization assistance information manager 930 may receive, from the serving cell, synchronization assistance information for the neighbor cell. In some cases, synchronization assistance information manager 930 may determine the distance between the neighbor cell and the UE. The distance may be indicated by the synchronization assistance information.

In an example of serving cell-assisted synchronization, SS block index manager 935 may determine an index of the neighbor cell SS block based on the synchronization assistance information. The index may identify the neighbor cell SS block relative to other SS blocks transmitted by the neighbor cell. In some cases, the neighbor cell SS block index is based on the second SS block. For example, SS block index manager 935 may identify index of the serving cell SS block and select that index as the index for the neighbor cell SS block. In some cases, the selection is based on a cell identifier included in the synchronization assistance information. In some cases, the selection is based on the determination that the distance between the serving cell and the neighbor cell satisfies a distance threshold. In some cases, the selection is based on detecting that the neighbor cell SS block was received during a time duration indicated by the synchronization assistance information.

In some cases, SS block index manager 935 may obtain, based on a cell ID indicated by the synchronization assistance information, the index of the neighbor cell SS block from a control channel signal of the neighbor cell SS block. For example, SS block index manager 935 may determine the index of the neighbor cell SS block from a first PBCH signal of the first SS block and a second PBCH signal of the second SS block. In some cases, the determination may be based on detecting that the neighbor cell SS block was received outside a time duration indicated by the synchronization assistance information. In some cases, SS block index manager 935 may identify the index of a serving cell SS block that is received within resources used for transmission of multiple SS blocks by the serving cell.

In an example of serving assistance-less synchronization, SS block index manager 935 may determine the index of the neighbor cell SS block based on an index of the serving cell SS block. In some cases, SS block index manager 935 may obtain a new index for the neighbor cell SS block from a control channel included in the neighbor cell SS block. Obtaining the new index may be based on the relationship between indices for SS blocks from the serving cell and indices for SS blocks from the neighbor cell. In some cases, SS block index manager 935 may confirm the index of the neighbor cell SS block based at least in part on the determination that a response has not been received within a threshold period of time following transmission of a message to the serving cell.

Communications manager 940 may transmit a message identifying the neighbor cell and indicating that the wireless device 905 received the neighbor cell SS block. Communications manager 940 may receive, based on the transmission, a transmission from the serving cell indicating a relationship between indices for SS blocks from the serving cell and indices for SS blocks from the neighbor cell. In some cases, communications manager 940 may determine that a response from the serving cell has not been received within a threshold period of time following the transmission.

SS block combiner 950 may identify, based at least in part on synchronization assistance information, a number of SS blocks transmitted by the neighbor cell during a time duration. SS block combiner 950 may select another neighbor cell SS block to combine with the first neighbor cell SS block based at least in part on the identified number of SS blocks. Neighbor cell timing manager 945 may determine a symbol or slot timing for the neighbor cell based on the index of the neighbor cell SS block.

Transmitter 920 may transmit signals generated by other components of the device. In some examples, the transmitter 920 may be collocated with a receiver 910 in a transceiver module. For example, the transmitter 920 may be an example of aspects of the transceiver 1035 described with reference to FIG. 10. The transmitter 920 may utilize a single antenna or a set of antennas.

Figure 10:
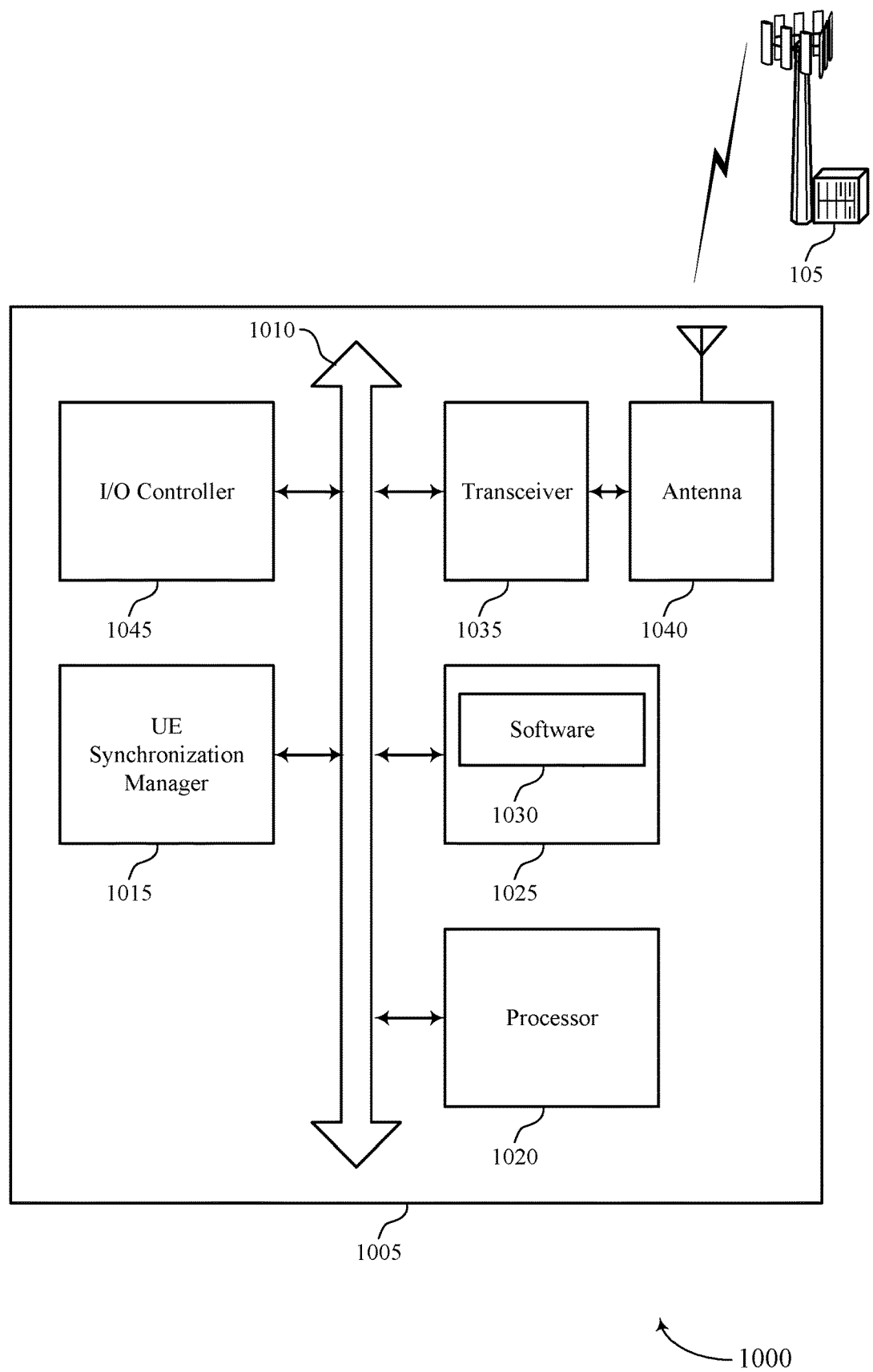
FIG. 10 illustrates a block diagram of a system including a UE that supports neighbor cell synchronization signal block index determination in accordance with aspects of the present disclosure.

FIG. 10 shows a diagram of a system 1000 including a device 1005 that supports neighbor cell synchronization signal block index determination in accordance with aspects of the present disclosure. Device 1005 may be an example of or include the components of wireless device 805, wireless device 905, or a UE 115 as described above, e.g., with reference to FIGS. 8 and 9. Device 1005 may include components for bi-directional voice and data communications including components for transmitting and receiving communications, including UE synchronization manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting neighbor cell synchronization signal block index determination).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support neighbor cell synchronization signal block index determination. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
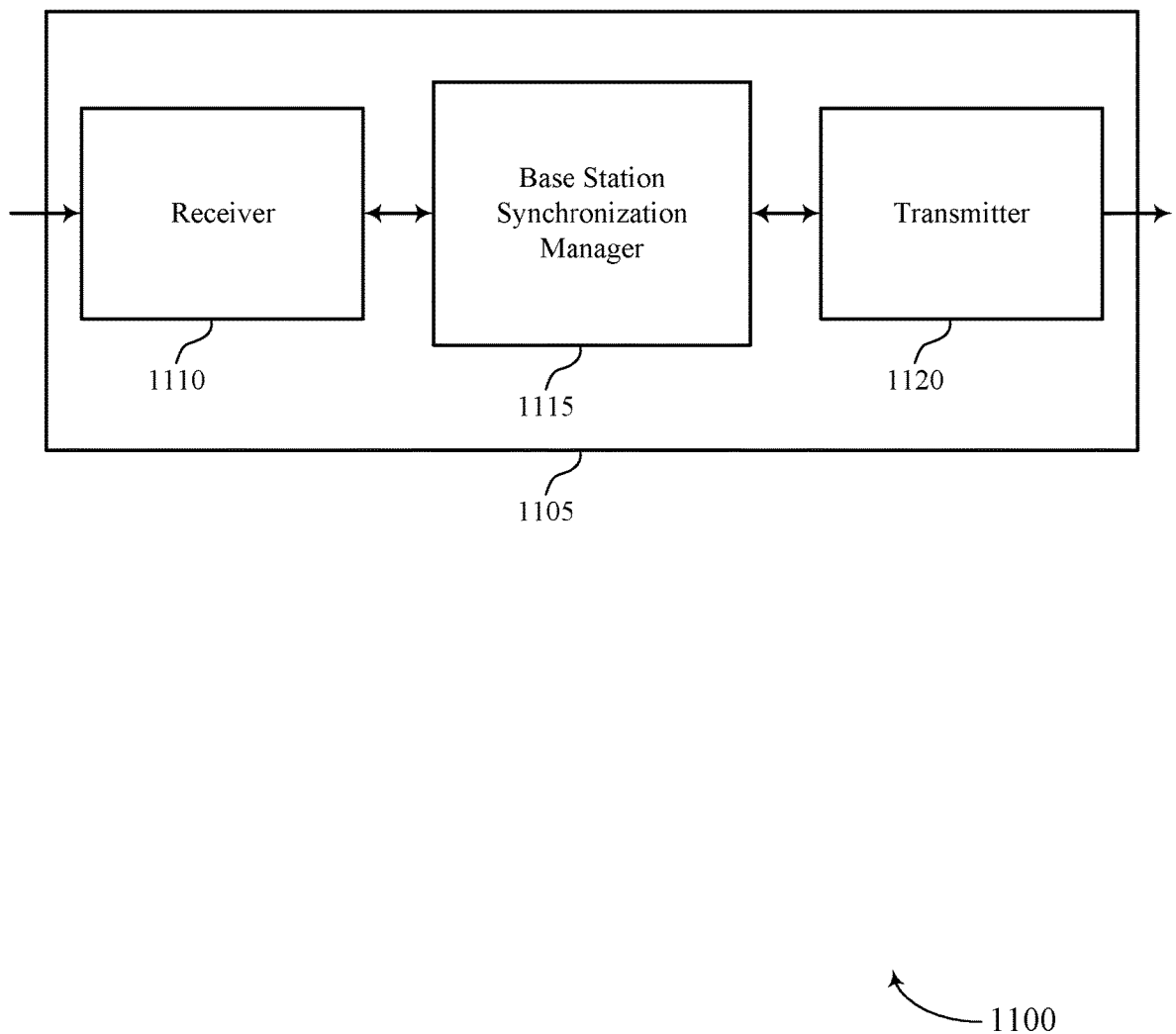
FIG. 11 shows a block diagram of a device that supports neighbor cell synchronization signal block index determination in accordance with aspects of the present disclosure.

FIG. 11 shows a block diagram 1100 of a wireless device 1105 that supports neighbor cell synchronization signal block index determination in accordance with aspects of the present disclosure. Wireless device 1105 may be an example of aspects of a base station 105 as described herein. Wireless device 1105 may include receiver 1110, base station synchronization manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to neighbor cell synchronization signal block index determination, etc.). Information may be passed on to other components of the device. The receiver 1110 may be an example of aspects of the transceiver 1335 described with reference to FIG. 13. The receiver 1110 may utilize a single antenna or a set of antennas.

In an example of assisted synchronization, base station synchronization manager 1115 may transmit a set of SS blocks using a set of transmit beams. Each SS block in the set of SS blocks may have an index identifying the SS block relative to other SS blocks in the set. Base station synchronization manager 1115 may determine synchronization assistance information for a neighbor cell of a UE, and may transmit the synchronization assistance information to the UE.

In an example of assistance-less synchronization, base station synchronization manager 1115 may receive a message from the UE identifying a neighbor cell and indicating that the UE received an SS block from the neighbor cell. Base station synchronization manager 1115 may determine, based on the message, a relationship between indices for SS blocks from the serving cell and indices for SS blocks from the neighbor cell. Base station synchronization manager 1115 may transmit, to the UE, synchronization assistance information based on the determined relationship. Base station synchronization manager 1115 may be an example of aspects of the base station synchronization manager 1315 described with reference to FIG. 13.

Base station synchronization manager 1115 and/or at least some of its various sub-components may be implemented in hardware, software executed by a processor, firmware, or any combination thereof. If implemented in software executed by a processor, the functions of the base station synchronization manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station synchronization manager 1115 and/or at least some of its various sub-components may be physically located at various positions, including being distributed such that portions of functions are implemented at different physical locations by one or more physical devices.

In some examples, base station synchronization manager 1115 and/or at least some of its various sub-components may be a separate and distinct component in accordance with various aspects of the present disclosure. In other examples, base station synchronization manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
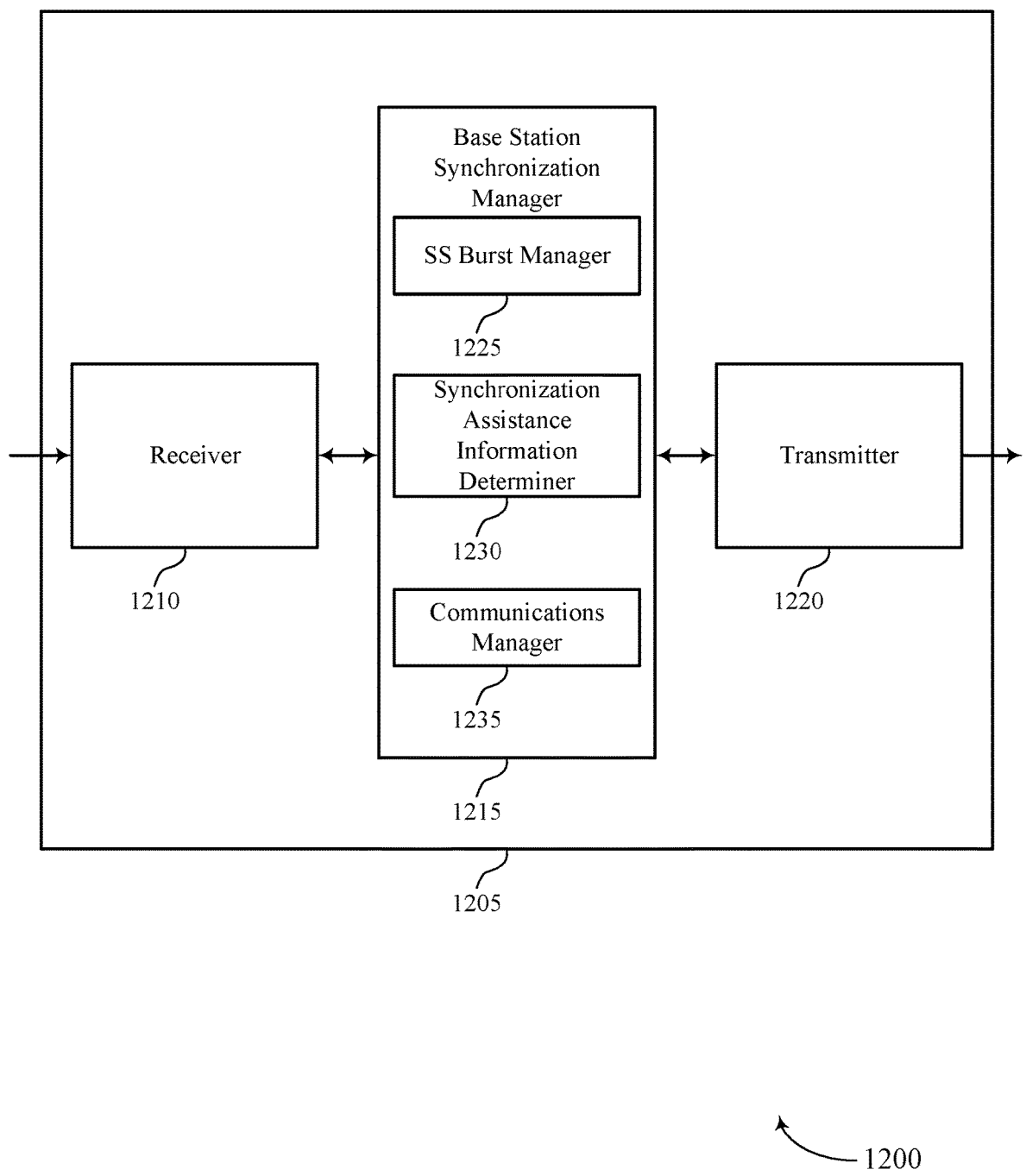
FIG. 12 shows a block diagram of a device that supports neighbor cell synchronization signal block index determination in accordance with aspects of the present disclosure.

FIG. 12 shows a block diagram 1200 of a wireless device 1205 that supports neighbor cell synchronization signal block index determination in accordance with aspects of the present disclosure. Wireless device 1205 may be an example of aspects of a wireless device 1105 or a base station 105 as described with reference to FIG. 11. Wireless device 1205 may include receiver 1210, base station synchronization manager 1215, and transmitter 1220. Wireless device 1205 may also include a processor. Each of these components may be in communication with one another (e.g., via one or more buses). Wireless device 1205 may be associated with a serving cell and may serve a UE that has received an SS block from a neighbor cell.

Receiver 1210 may receive information such as packets, user data, or control information associated with various information channels (e.g., control channels, data channels, and information related to neighbor cell synchronization signal block index determination, etc.). Information may be passed on to other components of the device. The receiver 1210 may be an example of aspects of the transceiver 1335 described with reference to FIG. 13. The receiver 1210 may utilize a single antenna or a set of antennas.

Base station synchronization manager 1215 may also include SS burst manager 1225, synchronization assistance information determiner 1230, and communications manager 1235. Base station synchronization manager 1215 may be an example of aspects of the base station synchronization manager 1315 described with reference to FIG. 13.

SS burst manager 1225 may transmit a set of SS blocks using a set of transmit beams. In some cases, each SS block in the set of SS blocks may have an index identifying the SS block relative to other SS blocks in the set. In some cases, SS burst manager may transmit an SS block as one of a set of beamformed SS block transmissions.

Synchronization assistance information determiner 1230 may determine synchronization assistance information for a neighbor cell of the UE. In some examples, synchronization assistance information determiner 1230 may determine a set of cells that are within a distance threshold from the wireless device 1205. In such cases, the synchronization assistance information may indicate the set of cells. In some cases, synchronization assistance information determiner 1230 may determine a set of cells that are more than a distance threshold from the wireless device 1205. In such cases, the synchronization assistance information may indicate the set of cells.

In some cases, synchronization assistance information determiner 1230 may determine a distance between the wireless device 1205 and the neighbor cell. In such cases, the synchronization assistance information may indicate the distance. In some cases, synchronization assistance information determiner 1230 may determine a time duration during which the set of SS blocks are transmitted by SS burst manager 1225. In such cases, the synchronization assistance information may indicate the time duration. In some cases, synchronization assistance information determiner 1230 may determine a number of SS blocks transmitted in the set of SS blocks. In such cases, the synchronization assistance information may indicate the number of SS blocks. In some cases, synchronization assistance information determiner 1230 may determine a time duration following the transmission of the set of SS blocks. In such cases, the synchronization assistance information may indicate the time duration.

In some cases, synchronization assistance information determiner 1230 may determine, based on a message from the UE, a relationship between indices for SS blocks from the serving cell and indices for SS blocks from the neighbor cell. In some cases, determining the relationship between the indices for SS blocks from the serving cell and indices for SS blocks from the neighbor cell includes determining that a delay between transmission and reception of the SS block from the neighbor cell exceeds a delay threshold. In some cases, determining that the delay exceeds the delay threshold includes determining that a distance between the neighbor cell and the base station exceeds a distance threshold. In such cases, synchronization assistance information determiner 1230 may identify that the UE cannot use the index of a serving cell SS block as the index for a neighbor cell SS block.

In some cases, determining the relationship between the indices for SS blocks from the serving cell and indices for SS blocks from the neighbor cell includes determining that a delay between transmission and reception of the SS block from the neighbor cell is less than a delay threshold. In such cases, synchronization assistance information determiner 1230 may identify that the UE can use the index of a serving cell SS block as the index for a neighbor cell SS block. In some cases, determining that the delay is less than the delay threshold includes determining that a distance between the neighbor cell and the base station is less than a distance threshold.

Communications manager 1235 may transmit the synchronization assistance information to the UE, receive, from the UE, a message identifying a neighbor cell and indicating that the UE received a first SS block from the neighbor cell. In some cases, the synchronization assistance information is transmitted to the UE based on the relationship between the indices for SS blocks from the serving cell and indices for SS blocks from the neighbor cell.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1335 described with reference to FIG. 13. The transmitter 1220 may utilize a single antenna or a set of antennas.

Figure 13:
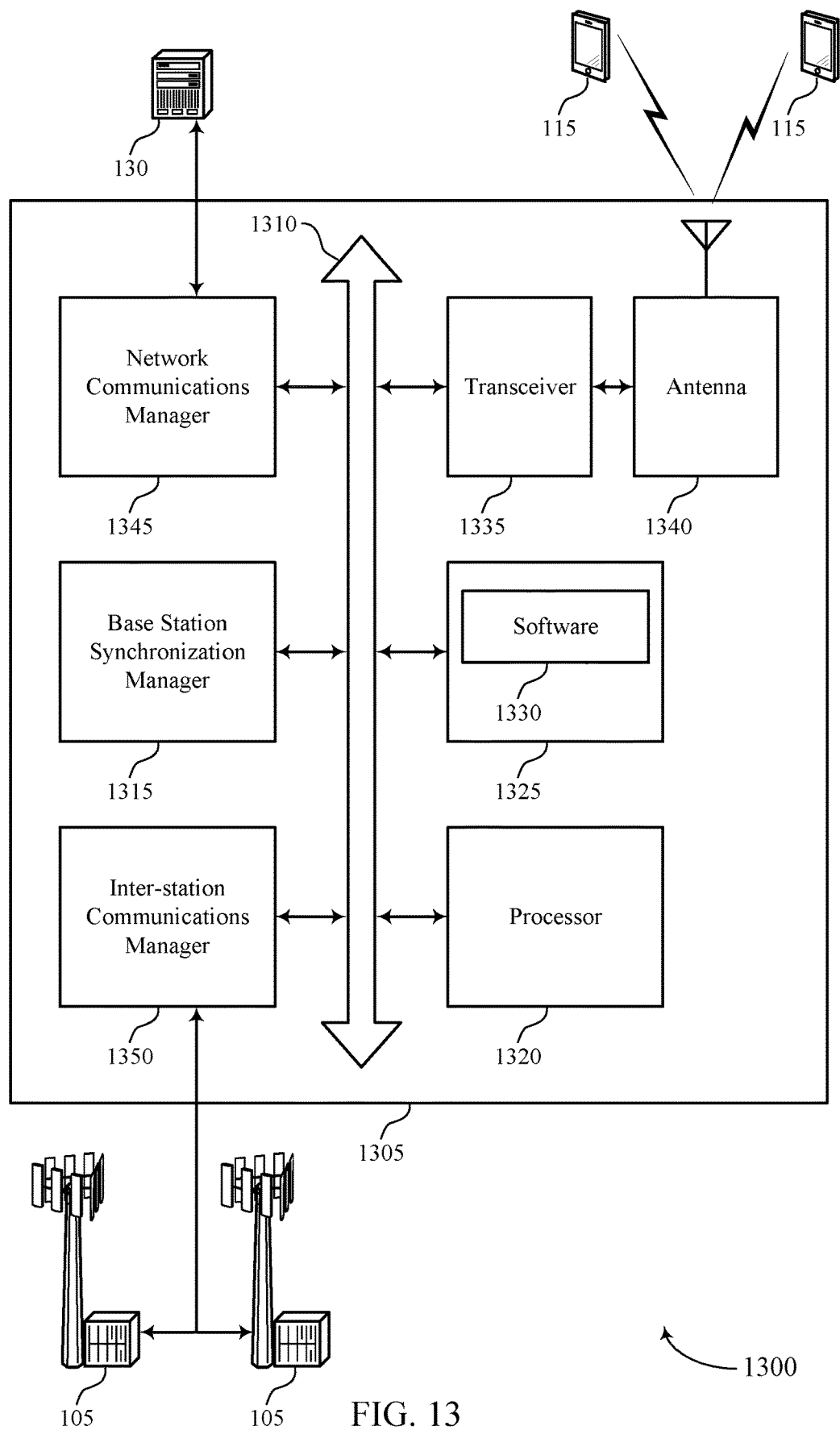
FIG. 13 illustrates a block diagram of a system including a base station that supports neighbor cell synchronization signal block index determination in accordance with aspects of the present disclosure.

FIG. 13 shows a diagram of a system 1300 including a device 1305 that supports neighbor cell synchronization signal block index determination in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station synchronization manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting neighbor cell synchronization signal block index determination).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support neighbor cell synchronization signal block index determination. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base stations 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
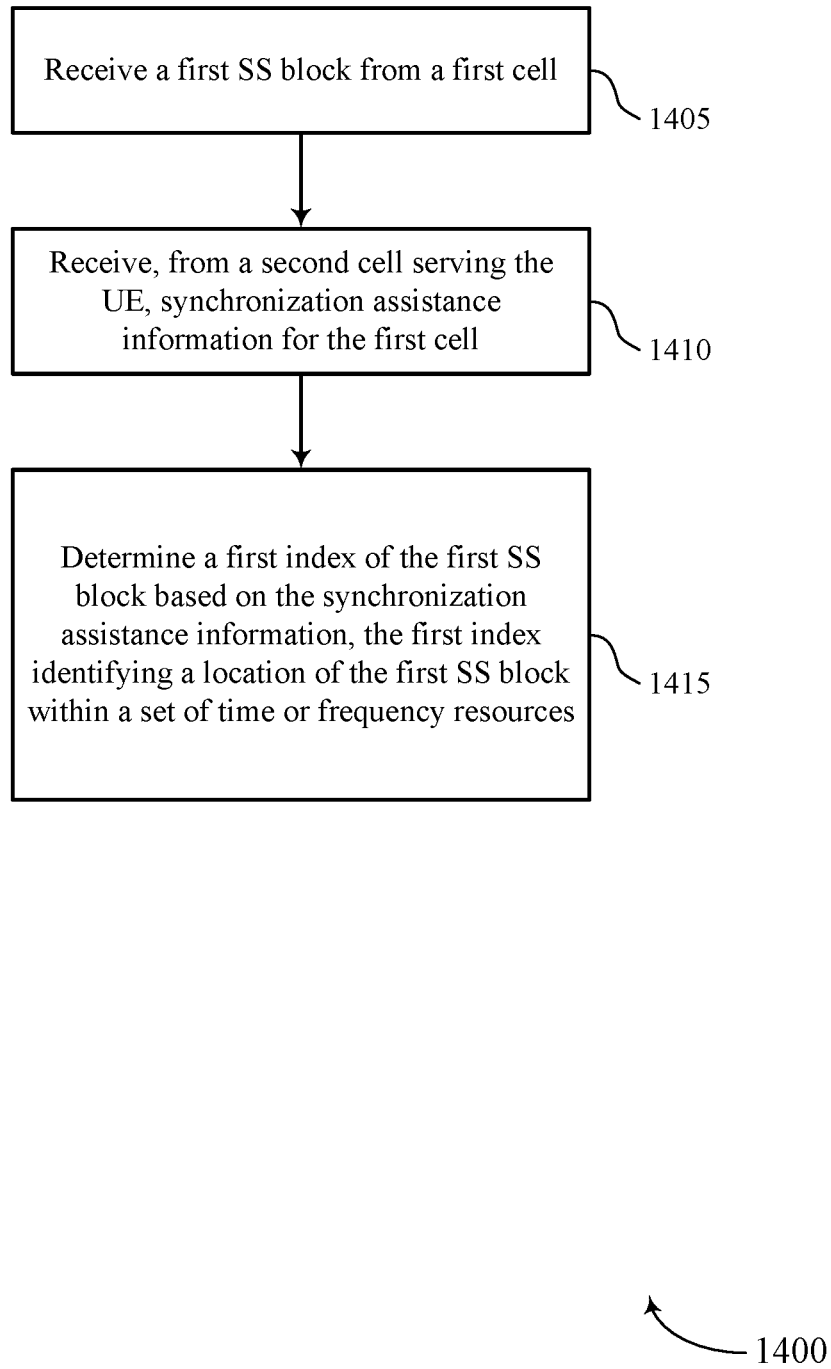
FIGS. 14 through 17 illustrate methods for neighbor cell synchronization signal block index determination in accordance with aspects of the present disclosure.

FIG. 14 shows a flowchart illustrating a method 1400 for neighbor cell synchronization signal block index determination in accordance with aspects of the present disclosure. The operations of method 1400 may be implemented by a UE 115 or its components as described herein. For example, the operations of method 1400 may be performed by a UE synchronization manager as described with reference to FIGS. 8 and 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a first SS block from a first cell. The operations of block 1405 may be performed according to the methods described herein. In certain examples, aspects of the operations of block 1405 may be performed by a SS block manager as described with reference to FIG. 9. At block 1410 the UE 115 may receive, from a second cell serving the UE, synchronization assistance information for the first cell. The operations of block 1410 may be performed according to the methods described herein. In certain examples, aspects of the operations of block 1410 may be performed by a synchronization assistance information manager as described with reference to FIG. 9.

At block 1415 the UE 115 may determine a first index of the first SS block based at least in part on the synchronization assistance information. The first index may identify a location of the first SS block within a set of time or frequency resources. The operations of block 1415 may be performed according to the methods described herein. In certain examples, aspects of the operations of block 1415 may be performed by a SS block index manager as described with reference to FIG. 9.

Figure 15:
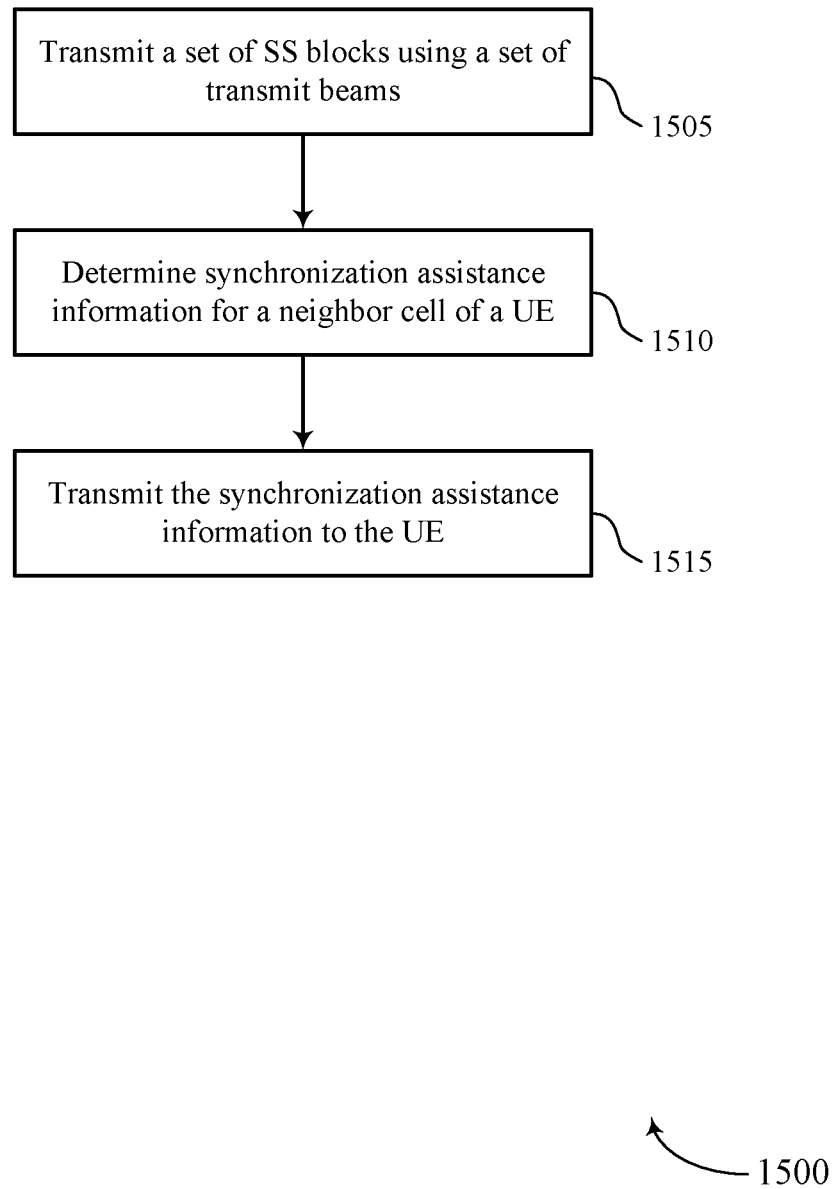

FIG. 15 shows a flowchart illustrating a method 1500 for neighbor cell synchronization signal block index determination in accordance with aspects of the present disclosure. The operations of method 1500 may be implemented by a base station 105 or its components as described herein. For example, the operations of method 1500 may be performed by a base station synchronization manager as described with reference to FIGS. 11 and 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit a plurality of SS blocks using a plurality of transmit beams. In some cases, each SS block of the plurality of SS blocks may have an index identifying the SS block relative to other SS blocks of the plurality of SS blocks. The operations of block 1505 may be performed according to the methods described herein. In certain examples, aspects of the operations of block 1505 may be performed by a SS burst manager as described with reference to FIG. 12.

At block 1510 the base station 105 may determine synchronization assistance information for a neighbor cell of a UE. The operations of block 1510 may be performed according to the methods described herein. In certain examples, aspects of the operations of block 1510 may be performed by a synchronization assistance information determiner as described with reference to FIG. 12.

At block 1515 the base station 105 may transmit the synchronization assistance information to the UE. The operations of block 1515 may be performed according to the methods described herein. In certain examples, aspects of the operations of block 1515 may be performed by a communications manager as described with reference to FIG. 12.

Figure 16:
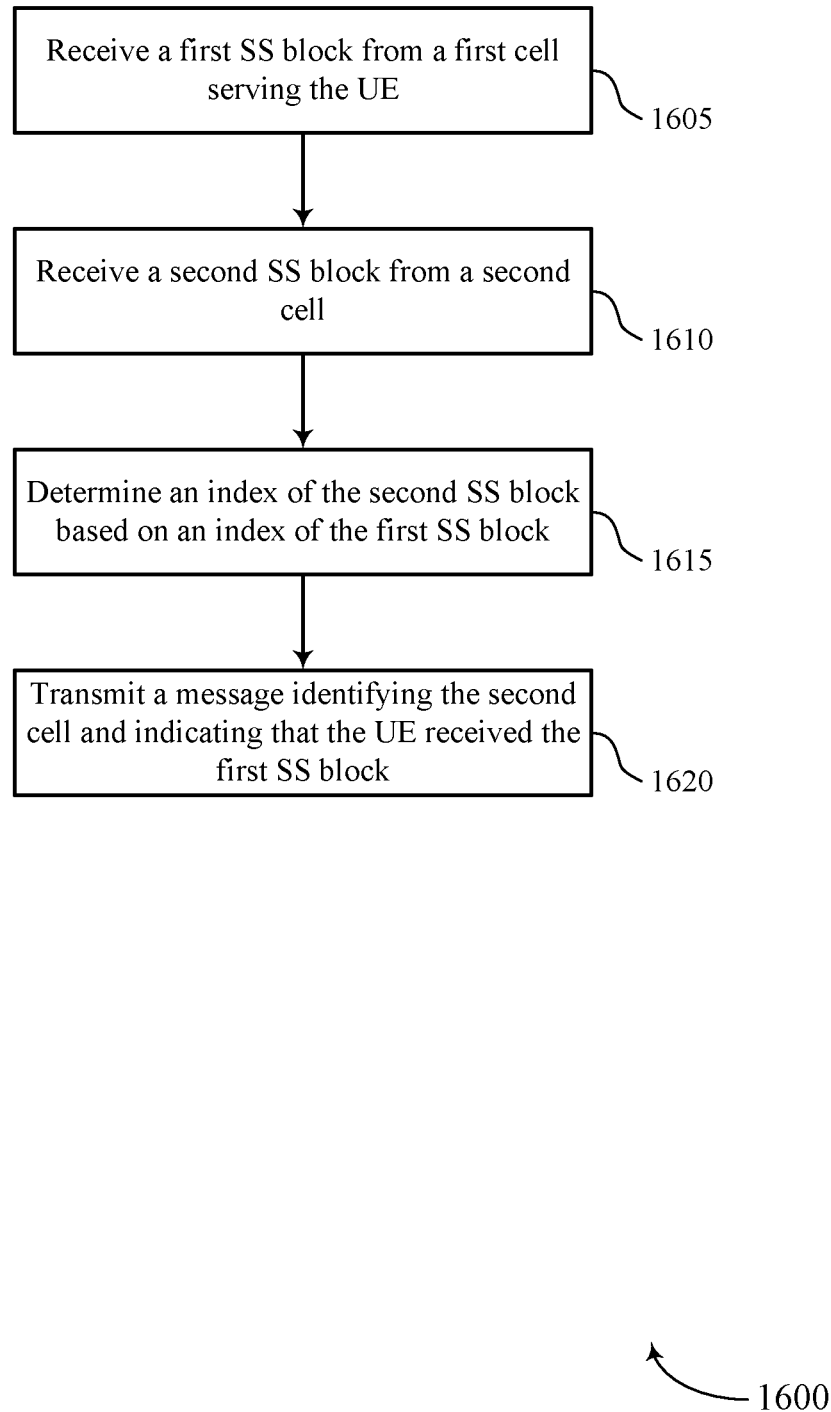

FIG. 16 shows a flowchart illustrating a method 1600 for neighbor cell synchronization signal block index determination in accordance with aspects of the present disclosure. The operations of method 1600 may be implemented by a UE 115 or its components as described herein. For example, the operations of method 1600 may be performed by a UE synchronization manager as described with reference to FIGS. 8 and 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a first SS block from a first cell serving the UE. The operations of block 1605 may be performed according to the methods described herein. In certain examples, aspects of the operations of block 1605 may be performed by a SS block manager as described with reference to FIG. 9. At block 1610 the UE 115 may receive a second SS block from a second cell. The operations of block 1610 may be performed according to the methods described herein. In certain examples, aspects of the operations of block 1610 may be performed by a SS block manager as described with reference to FIG. 9.

At block 1615 the UE 115 may determine an index of the second SS block based at least in part on an index of the first SS block. The operations of block 1615 may be performed according to the methods described herein. In certain examples, aspects of the operations of block 1615 may be performed by a SS block index manager as described with reference to FIG. 9. At block 1620 the UE 115 may transmit a message identifying the second cell and indicating that the UE received the first SS block. The operations of block 1620 may be performed according to the methods described herein. In certain examples, aspects of the operations of block 1620 may be performed by a communications manager as described with reference to FIG. 9.

Figure 17:
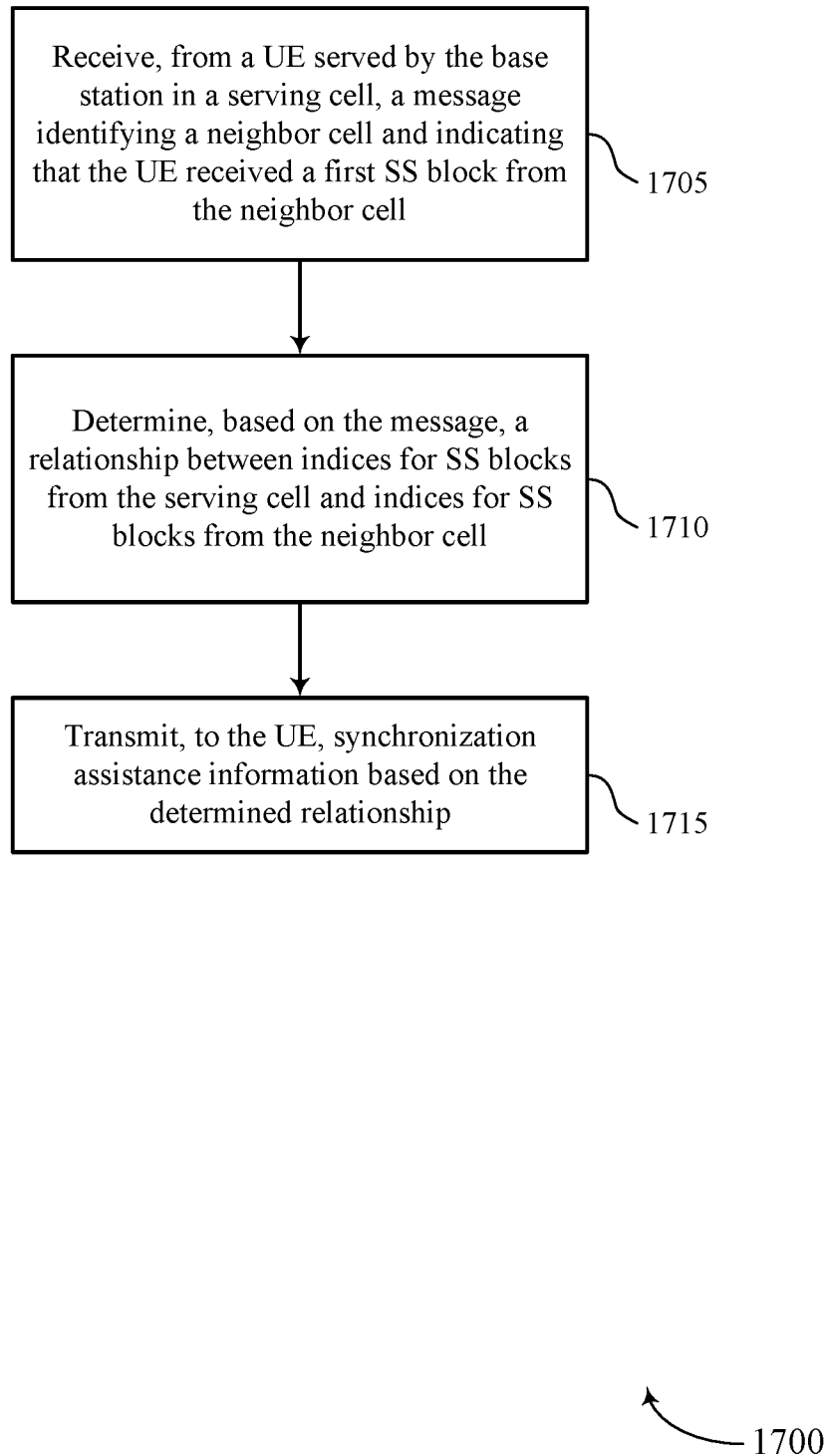

FIG. 17 shows a flowchart illustrating a method 1700 for neighbor cell synchronization signal block index determination in accordance with aspects of the present disclosure. The operations of method 1700 may be implemented by a base station 105 or its components as described herein. For example, the operations of method 1700 may be performed by a base station synchronization manager as described with reference to FIGS. 11 and 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may receive, from a user equipment (UE) served by the base station in a serving cell, a message identifying a neighbor cell and indicating that the UE received a first SS block from the neighbor cell. The operations of block 1705 may be performed according to the methods described herein. In certain examples, aspects of the operations of block 1705 may be performed by a communications manager as described with reference to FIG. 12.

At block 1710 the base station 105 may determine, based at least in part on the message, a relationship between indices for SS blocks from the serving cell and indices for SS blocks from the neighbor cell. The operations of block 1710 may be performed according to the methods described herein. In certain examples, aspects of the operations of block 1710 may be performed by a synchronization assistance information determiner as described with reference to FIG. 12.

At block 1715 the base station 105 may transmit, to the UE, synchronization assistance information based at least in part on the determined relationship. The operations of block 1715 may be performed according to the methods described herein. In certain examples, aspects of the operations of block 1715 may be performed by a communications manager as described with reference to FIG. 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a first synchronization signal (SS) block from a first cell;
receiving, from a second cell, synchronization assistance information for the first cell;
determining a first index of the first SS block based at least in part on the synchronization assistance information, the first index identifying a location of the first SS block within a set of time or frequency resources; and
receiving a second SS block from the second cell, wherein determining the first index is further based at least in part on the second SS block.

2. The method of claim 1, wherein the first SS block comprises a primary synchronization signal (PSS), a secondary synchronization signal (SSS), a physical broadcast control channel (PBCH), and a demodulation reference signal (DMRS) for PBCH.

3. The method of claim 1, wherein the set of time or frequency resources identify resources allocated for transmission of multiple SS blocks by the first cell using a plurality of transmit beams.

4. The method of claim 1, further comprising:
determining a symbol or slot timing for the first cell based at least in part on the determined first index.

5. The method of claim 1, wherein determining the first index comprises:
identifying a second index of the second SS block within resources used for transmission of a plurality of SS blocks by the second cell; and
selecting the second index as the first index.

6. The method of claim 5, further comprising:
selecting the second index as the first index is based at least in part on a cell identifier included in the synchronization assistance information.

7. The method of claim 1, further comprising:
identifying, based at least in part on the synchronization assistance information, a number of SS blocks transmitted by the first cell during a time duration.

8. The method of claim 1, further comprising:
determining a duration of an SS burst based at least in part on the synchronization assistance information, wherein the SS burst comprises a plurality of SS blocks from the first cell.

9. The method of claim 8, further comprising:
determining that the duration of the SS burst fails to satisfy a threshold; and
obtaining a second index from a control channel signal included in the second SS block.

10. The method of claim 8, further comprising:
determining that the duration of the SS burst satisfies a threshold; and
selecting a second index of the second SS block received from the second cell as the first index.

11. The method of claim 1, further comprising:
detecting that the first SS block was received during a time duration indicated by the synchronization assistance information; and
selecting a second index of the second SS block as the first index based at least in part on the detection, wherein the second index identifies a location of the second SS block within resources used for transmission of a plurality of SS blocks by the second cell.

12. The method of claim 1, further comprising:
detecting that the first SS block was received outside a time duration indicated by the synchronization assistance information; and
obtaining a second index from a control channel signal included in the second SS block based at least in part on the detection.

13. A method for wireless communication at a base station, comprising:
transmitting a plurality of synchronization signal (SS) blocks using a plurality of transmit beams;
determining synchronization assistance information for a neighbor cell of a user equipment (UE); and
transmitting the synchronization assistance information to the UE, wherein the synchronization assistance information is specific to the neighbor cell or a group of neighbor cells comprising the neighbor cell.

14. The method of claim 13, wherein each SS block of the plurality of SS blocks has an index identifying the SS block relative to other SS blocks of the plurality of SS blocks.

15. The method of claim 13, wherein the synchronization assistance information is specific to the UE or a group of UEs comprising the UE.

16. The method of claim 13, wherein the synchronization assistance information is used by the UE to identify a second index for a SS block received from the neighbor cell.

17. The method of claim 13, further comprising:
determining a time duration during which the plurality of SS blocks are transmitted, wherein the synchronization assistance information indicates the time duration.

18. The method of claim 13, further comprising:
determining a number of SS blocks transmitted in the plurality of SS blocks by the neighbor cell, wherein the synchronization assistance information indicates the number of SS blocks.

19. The method of claim 13, further comprising:
determining a time duration following the transmission of the plurality of SS blocks, wherein the synchronization assistance information indicates the time duration.

20. The method of claim 13, wherein a first SS block of the plurality of SS blocks is transmitted by the neighbor cell as one of a plurality of beamformed SS block transmissions, the plurality of beamformed SS block transmissions each associated with one or more of a plurality of SS block indices.

21. A method for wireless communication at a user equipment (UE), comprising:
receiving a first synchronization signal (SS) block from a first cell serving the UE;
receiving a second SS block from a second cell;
determining an index of the second SS block based at least in part on an index of the first SS block;
transmitting a message identifying the second cell and indicating that the UE received the second SS block; and
receiving, based on the transmission, a transmission from the first cell indicating a relationship between indices for SS blocks from the first cell and indices for SS blocks from the second cell.

22. The method of claim 21, further comprising:
determining a symbol or slot timing for the second cell based on the index of the second SS block.

23. The method of claim 21, further comprising:
obtaining a new index of the second SS block from a control channel included in the second SS block based on the relationship.

24. The method of claim 21, further comprising:
determining that a response from the first cell has not been received within a threshold period of time following the transmission; and
confirming the determined index of the second SS block based at least in part on the determination that the response has not been received.

25. A method for wireless communication at a base station, comprising:
receiving, from a user equipment (UE) served by the base station in a serving cell, a message identifying a neighbor cell and indicating that the UE received a first synchronization signal (SS) block from the neighbor cell;
determining, based at least in part on the message, a relationship between indices for SS blocks from the serving cell and indices for SS blocks from the neighbor cell; and
transmitting, to the UE, synchronization assistance information based at least in part on the determined relationship;
wherein determining the relationship between the indices for SS blocks from the serving cell and the indices for SS blocks from the neighbor cell comprises:
determining that a delay between transmission and reception of the SS block from the neighbor cell is less than a delay threshold; and
the method further comprising identifying that the UE can use a first index of a second SS block transmitted by the base station as a second index for the first SS block.

* * * * *